US012500831B2

(12) United States Patent
Lin et al.

(10) Patent No.: US 12,500,831 B2
(45) Date of Patent: Dec. 16, 2025

(54) METHOD AND APPARATUS FOR DETERMINING SEGMENT IDENTITY

(71) Applicant: New H3C Technologies Co., Ltd., Hangzhou (CN)

(72) Inventors: Changwang Lin, Beijing (CN); Mengxiao Chen, Beijing (CN); Hao Li, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 295 days.

(21) Appl. No.: 18/288,158

(22) PCT Filed: Feb. 25, 2022

(86) PCT No.: PCT/CN2022/078065
§ 371 (c)(1),
(2) Date: Oct. 24, 2023

(87) PCT Pub. No.: WO2023/045247
PCT Pub. Date: Mar. 30, 2023

(65) Prior Publication Data
US 2024/0205134 A1    Jun. 20, 2024

(30) Foreign Application Priority Data

Sep. 22, 2021    (CN) .......................... 202111108022.6

(51) Int. Cl.
*H04L 45/03* (2022.01)
*H04L 45/00* (2022.01)
(Continued)

(52) U.S. Cl.
CPC .............. *H04L 45/03* (2022.05); *H04L 45/34* (2013.01); *H04L 45/745* (2013.01); *H04L 45/52* (2013.01)

(58) Field of Classification Search
CPC ....... H04L 45/03; H04L 45/34; H04L 45/745; H04L 45/52
(Continued)

(56) References Cited

U.S. PATENT DOCUMENTS 11,323,371 B1 *    5/2022    Goud Gadela ......... H04L 45/34
2014/0254596 A1    9/2014    Filsfils et al.
(Continued)

FOREIGN PATENT DOCUMENTS

| CN | 105450437 | 3/2016 |
|----|-----------|--------|
| CN | 107968752 | 4/2018 |

(Continued)

OTHER PUBLICATIONS

Extended European Search Report issued in Corresponding European Application No. 22871313.7, dated Aug. 26, 2024.
(Continued)

*Primary Examiner* — Anthony Mejia
(74) *Attorney, Agent, or Firm* — NORTON ROSE FULBRIGHT US LLP

(57) ABSTRACT

A method and a device for determining a Segment Identity by receiving a first message and a second message sent by a second device; the first message including at least one first Block Identity and a boundary address of an address space corresponding to each first Block Identity; the second message including at least a second Block Identity and a first index value; calculating the first SID by using a boundary address of a first address space corresponding to a same Block and the first index value, wherein the same Block is a Block characterized by the same Block Identity in at least one first Block Identity and at least one second Block Identity. The overhead of messages in the process of issuing SIDs is reduced, thus ensuring the performance of devices and the stability of message transmission protocol.

25 Claims, 7 Drawing Sheets

(51) Int. Cl.
*H04L 45/745* (2022.01)
*H04L 45/52* (2022.01)

(58) Field of Classification Search
USPC .......................................... 370/392
See application file for complete search history.

(56) References Cited

U.S. PATENT DOCUMENTS

| | | | |
|---|---|---|---|
| 2015/0326675 | A1 | 11/2015 | Kini et al. |
| 2020/0344151 | A1 | 10/2020 | Joseph et al. |
| 2021/0029026 | A1 | 1/2021 | Deshmukh et al. |
| 2021/0092053 | A1 | 3/2021 | Filsfils et al. |
| 2023/0044639 | A1* | 2/2023 | Zhao ............... H04L 45/80 |
| 2023/0073121 | A1* | 3/2023 | Geng ............... H04L 45/566 |

FOREIGN PATENT DOCUMENTS

| | | | |
|---|---|---|---|
| CN | 109257279 | | 1/2019 |
| CN | 110995596 | | 4/2020 |
| CN | 111464439 | | 7/2020 |
| CN | 111628995 | | 9/2020 |
| CN | 112134801 | | 12/2020 |
| CN | 112583711 | | 3/2021 |
| CN | 113132229 | | 7/2021 |
| CN | 113206787 | | 8/2021 |
| CN | 113259238 | | 8/2021 |
| CN | 113691451 | | 11/2021 |
| EP | 4120742 A1 * | 1/2023 | ............ H04L 45/50 |
| EP | 4489370 A1 * | 1/2025 | ............ H04L 45/745 |
| KR | 20150137205 | | 12/2015 |
| WO | WO 2018072728 | | 4/2018 |
| WO | WO 2020132180 | | 6/2020 |
| WO | WO 2021135468 | | 7/2021 |

OTHER PUBLICATIONS

Office Action issued in corresponding Chinese Application No. 202280000349.8, dated Dec. 13, 2024.
Shi et al. "Research on network slicing technology based on SRv6", *Electronic Technology & Software Engineering*, 2020. (English Abstract Translation).
Cheng et al. "G-SID: SRv6 Header Compression Solution", *IEEE 20th International Conference on Communication Technology*, 2020, pp. 126-130.
Cheng, et al. "Shorter SRv6 SID Requirements draft-cheng-spring-shorter-srv6-SID-requirement-02", 2020, 15 pages.
He, et al. "Study on segment routing network and its application in traffic engineering" *Telecommunications Science*, 2016, 32(6): 186-194 (English Abstract).
International Search Report and Written Opinion issued in counterpart International Application No. PCT/CN2022/078065, mailed May 11, 2022.
Liu, et al. "SRv6 Compressed Path Recover Method draft-pl-spring-compr-path-recover-00", 2020, 12 pages.
Previdi, et al. "Segment routing Prefix SIDS extensions for BGP", 2018.
Tang, et al. "Improvement of SRv6 SID structure", *UTStarcom Telecom Co., Ltd.*, 2019, 5 pages (English Abstract).

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |     Length    |
+-+-+-+-+-+-+-+-+-+-+-+-+-+-+-+-+-+-+-+-+-+-+-+-+
|     Flags     |        Endpoint Behavior       |
+-+-+-+-+-+-+-+-+-+-+-+-+-+-+-+-+-+-+-+-+-+-+-+-+-+-+-+-+-+-+-+-+
| SID (128 bits) . . .                                          |
+-+-+-+-+-+-+-+-+-+-+-+-+-+-+-+-+-+-+-+-+-+-+-+-+-+-+-+-+-+-+-+-+
| SID (cont . . .)                                              |
+-+-+-+-+-+-+-+-+-+-+-+-+-+-+-+-+-+-+-+-+-+-+-+-+-+-+-+-+-+-+-+-+
| SID (cont . . .)                                              |
+-+-+-+-+-+-+-+-+-+-+-+-+-+-+-+-+-+-+-+-+-+-+-+-+-+-+-+-+-+-+-+-+
| SID (cont . . .)                                              |
+-+-+-+-+-+-+-+-+-+-+-+-+-+-+-+-+-+-+-+-+-+-+-+-+-+-+-+-+-+-+-+-+
|Sub-sub-TLV-len|       Sub-sub-TLVs (variable) . . .           |
+-+-+-+-+-+-+-+-+-+-+-+-+-+-+-+-+-+-+-+-+-+-+-+-+-+-+-+-+-+-+-+-+
```

Fig 1-a

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |     Length    |
+-+-+-+-+-+-+-+-+-+-+-+-+-+-+-+-+-+-+-+-+-+-+-+-+
|     Flags     |   Algorithm   |    Weight     |
+-+-+-+-+-+-+-+-+-+-+-+-+-+-+-+-+-+-+-+-+-+-+-+-+
|        Endpoint Behavior      |
+-+-+-+-+-+-+-+-+-+-+-+-+-+-+-+-+-+-+-+-+-+-+-+-+-+-+-+-+-+-+-+-+
| SID (128 bits) . . .                                          |
+-+-+-+-+-+-+-+-+-+-+-+-+-+-+-+-+-+-+-+-+-+-+-+-+-+-+-+-+-+-+-+-+
| SID (cont . . .)                                              |
+-+-+-+-+-+-+-+-+-+-+-+-+-+-+-+-+-+-+-+-+-+-+-+-+-+-+-+-+-+-+-+-+
| SID (cont . . .)                                              |
+-+-+-+-+-+-+-+-+-+-+-+-+-+-+-+-+-+-+-+-+-+-+-+-+-+-+-+-+-+-+-+-+
| SID (cont . . .)                                              |
+-+-+-+-+-+-+-+-+-+-+-+-+-+-+-+-+-+-+-+-+-+-+-+-+-+-+-+-+-+-+-+-+
|Sub-sub-tlv-len|       Sub-sub-TLVs (variable) . . .           |
+-+-+-+-+-+-+-+-+-+-+-+-+-+-+-+-+-+-+-+-+-+-+-+-+-+-+-+-+-+-+-+-+
```

Fig 1-b

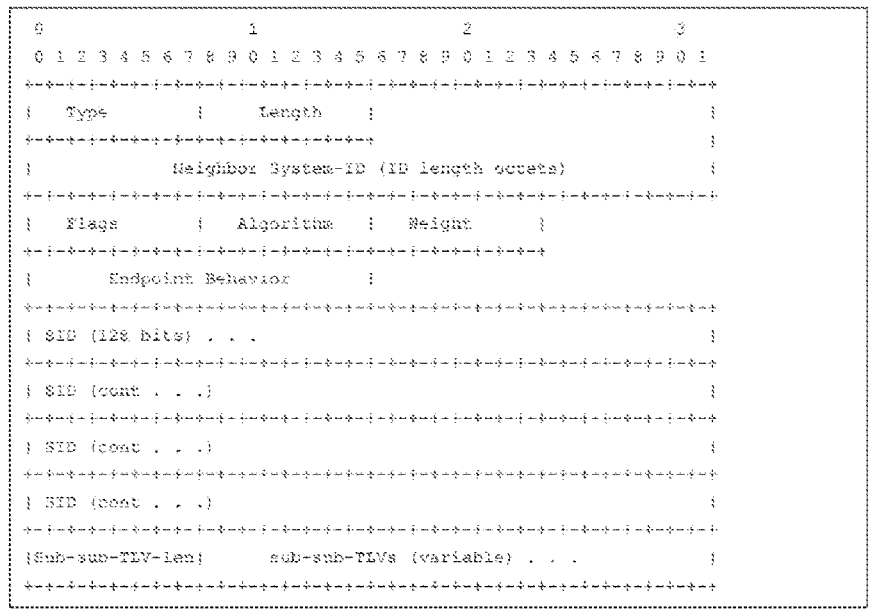
Fig 1-c
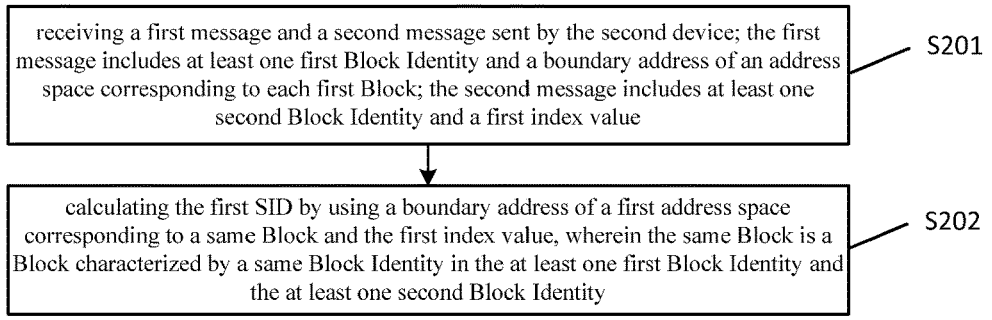
Fig 2
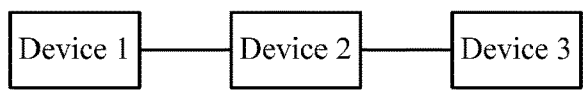
Fig 3
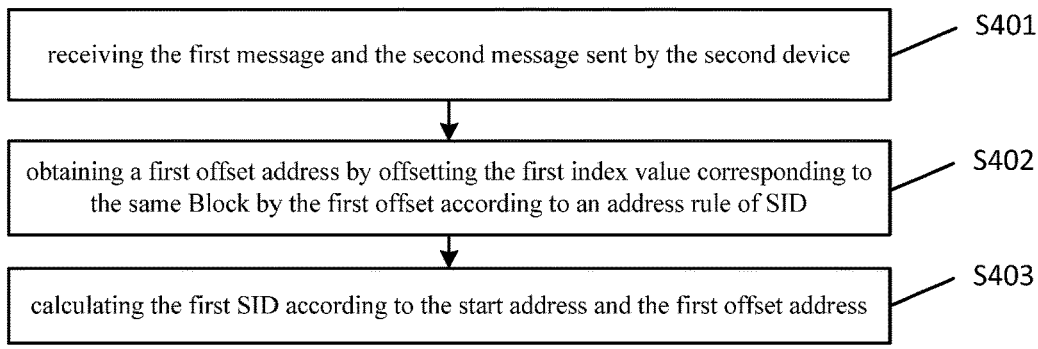
Fig 4
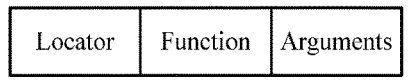
Fig 5

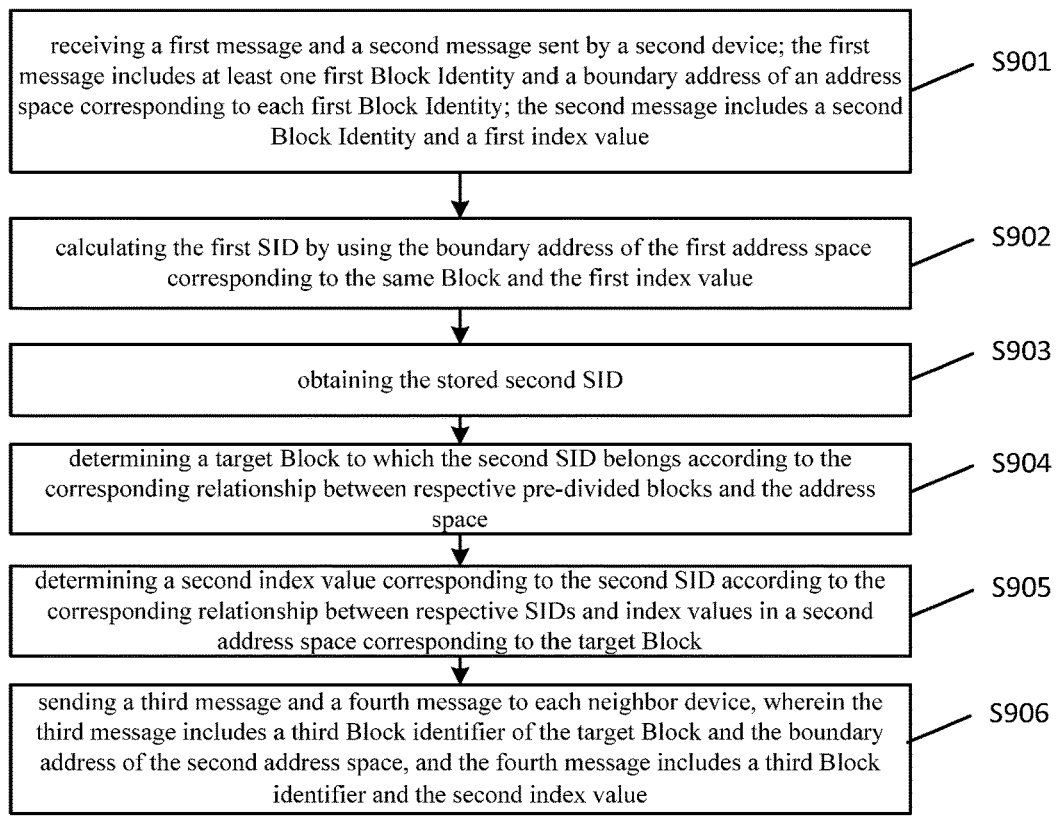
Fig 9
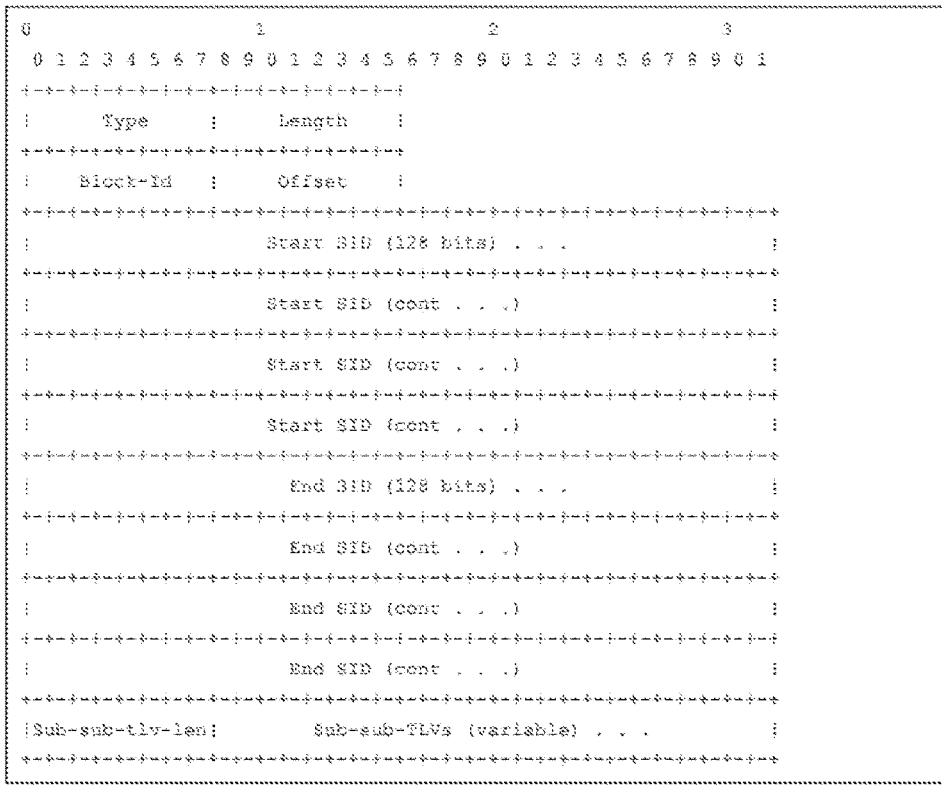
Fig 10-a

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|     Flags     |   Algorithm   |    Weight     |
+-+-+-+-+-+-+-+-+-+-+-+-+-+-+-+-+-+-+-+-+-+-+-+-+-+-+-+-+-+-+-+-+
|   Block-Id    |   Index Num   |  Index Length |
+-+-+-+-+-+-+-+-+-+-+-+-+-+-+-+-+-+-+-+-+-+-+-+-+-+-+-+-+-+-+-+-+
|        Index 0 (variable)     |    Endpoint Behavior 0        |
+-+-+-+-+-+-+-+-+-+-+-+-+-+-+-+-+-+-+-+-+-+-+-+-+-+-+-+-+-+-+-+-+
|        Index 1 (variable)     |    Endpoint Behavior 1        |
+-+-+-+-+-+-+-+-+-+-+-+-+-+-+-+-+-+-+-+-+-+-+-+-+-+-+-+-+-+-+-+-+
~                              ...                              ~
+-+-+-+-+-+-+-+-+-+-+-+-+-+-+-+-+-+-+-+-+-+-+-+-+-+-+-+-+-+-+-+-+
|     Index Num-1 (variable)    |   Endpoint Behavior Num-1     |
+-+-+-+-+-+-+-+-+-+-+-+-+-+-+-+-+-+-+-+-+-+-+-+-+-+-+-+-+-+-+-+-+
```

Fig 10-b

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|            Neighbor System-ID (ID length octets)              |
+-+-+-+-+-+-+-+-+-+-+-+-+-+-+-+-+-+-+-+-+-+-+-+-+-+-+-+-+-+-+-+-+
|     Flags     |   Algorithm   |    Weight     |
+-+-+-+-+-+-+-+-+-+-+-+-+-+-+-+-+-+-+-+-+-+-+-+-+-+-+-+-+-+-+-+-+
|   Block-Id    |   Index Num   |  Index Length |
+-+-+-+-+-+-+-+-+-+-+-+-+-+-+-+-+-+-+-+-+-+-+-+-+-+-+-+-+-+-+-+-+
|        Index 0 (variable)     |    Endpoint Behavior 0        |
+-+-+-+-+-+-+-+-+-+-+-+-+-+-+-+-+-+-+-+-+-+-+-+-+-+-+-+-+-+-+-+-+
|        Index 1 (variable)     |    Endpoint Behavior 1        |
+-+-+-+-+-+-+-+-+-+-+-+-+-+-+-+-+-+-+-+-+-+-+-+-+-+-+-+-+-+-+-+-+
~                              ...                              ~
+-+-+-+-+-+-+-+-+-+-+-+-+-+-+-+-+-+-+-+-+-+-+-+-+-+-+-+-+-+-+-+-+
|     Index Num-1 (variable)    |   Endpoint Behavior Num-1     |
+-+-+-+-+-+-+-+-+-+-+-+-+-+-+-+-+-+-+-+-+-+-+-+-+-+-+-+-+-+-+-+-+
```

Fig 10-c

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |
+-+-+-+-+-+-+-+-+-+-+-+-+-+-+-+-+-+-+-+-+-+-+-+-+-+-+-+-+-+-+-+-+
|   Block-Id    |   Index Num   |  Index Length |
+-+-+-+-+-+-+-+-+-+-+-+-+-+-+-+-+-+-+-+-+-+-+-+-+-+-+-+-+-+-+-+-+
|        Index 0 (variable)     |    Endpoint Behavior 0        |
+-+-+-+-+-+-+-+-+-+-+-+-+-+-+-+-+-+-+-+-+-+-+-+-+-+-+-+-+-+-+-+-+
|        Index 1 (variable)     |    Endpoint Behavior 1        |
+-+-+-+-+-+-+-+-+-+-+-+-+-+-+-+-+-+-+-+-+-+-+-+-+-+-+-+-+-+-+-+-+
~                              ...                              ~
+-+-+-+-+-+-+-+-+-+-+-+-+-+-+-+-+-+-+-+-+-+-+-+-+-+-+-+-+-+-+-+-+
|     Index Num-1 (variable)    |   Endpoint Behavior Num-1     |
+-+-+-+-+-+-+-+-+-+-+-+-+-+-+-+-+-+-+-+-+-+-+-+-+-+-+-+-+-+-+-+-+
```

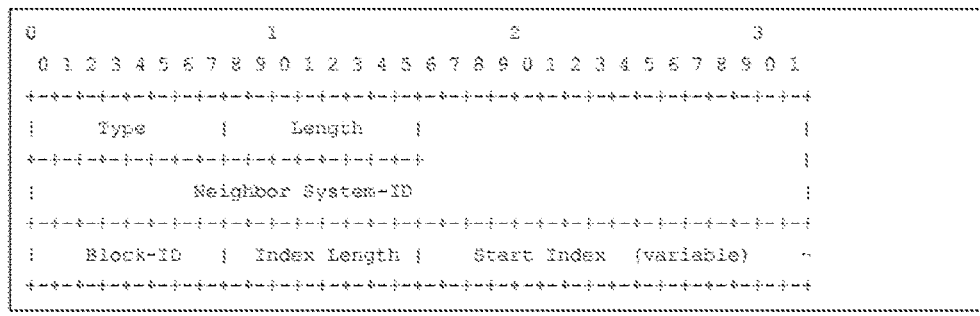
Fig 12-c
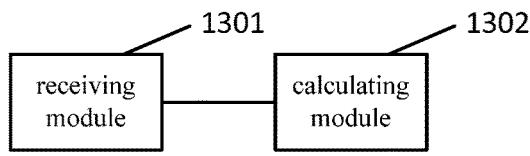
Fig 13-a
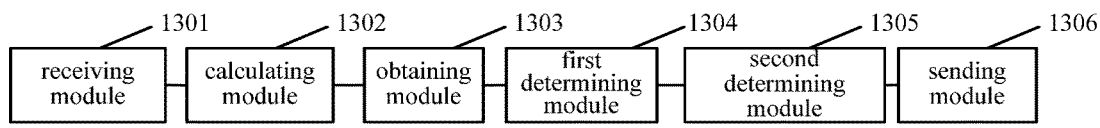
Fig 13-b
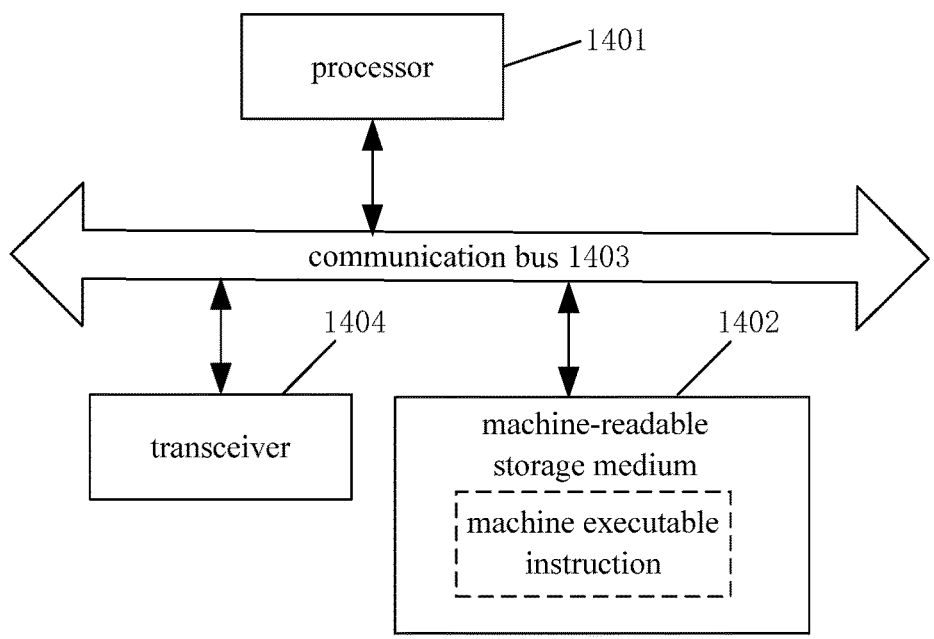
Fig 14

METHOD AND APPARATUS FOR DETERMINING SEGMENT IDENTITY

CROSS REFERENCE TO RELATED APPLICATIONS

The present disclosure is a national phase application under 35 U.S.C. § 371 of International Application No. PCT/CN2022/078065, filed Feb. 25, 2022, which claims the benefit of priority to Chinese patent application No. 202111108022.6 filed with the China National Intellectual Property Administration on Sep. 22, 2021 and entitled "METHOD AND APPARATUS FOR DETERMINING SEGMENT IDENTITY", each of which are incorporated herein by reference in their entirety.

TECHNICAL FIELD

The present disclosure relates to the field of communication, in particular to a method and an apparatus for determining a Segment Identity.

BACKGROUND

In the Segment Routing Internet Protocol Version 6 (SRv6) network, devices need to issue a Segment Identity (SID) in the SRv6 network in order to forward subsequent data traffic.

Each device in the SRv6 network sends a link state message to its corresponding neighboring device, and the link state message includes one or more complete SIDs. After receiving the link state message, the neighboring device of the device can determine the SID issued by the device.

SUMMARY

The purpose of the examples of the present disclosure is to provide a method and a device for determining a Segment Identity, so as to reduce the overhead of messages in the process of issuing SIDs, thus ensuring the performance of devices and the stability of message transmission protocol. The specific technical solution is as follows:

In a first aspect, an example of the present disclosure provides a method for determining a Segment Identity, which is applied to a first device in SRv6 network, and the SRv6 network further includes a second device, wherein the first device and the second device are neighbor devices to each other, and the second device stores a first Segment Identity SID, and the method includes:

receiving a first message and a second message sent by the second device; the first message comprises at least one first Block Identity and a boundary address of an address space corresponding to each first Block Identity; the second message comprises at least one second Block Identity and a first index value;

calculating the first SID by using a boundary address of a first address space corresponding to a same Block and the first index value, wherein the same Block is a Block characterized by a same Block Identity in the at least one first Block Identity and the at least one second Block Identity.

In an example, the first message includes a first sub-TLV, the first sub-TLV includes a block identity field, a start SID field and an End SID field; wherein the block identity field is to carry the at least one first Block Identity; the Start SID field is to carry a start address of an address space corresponding to each first Block; the End SID field is to carry the end address of an address space corresponding to each first Block.

In an example, the first sub-TLV further includes an offset field, wherein the offset field is to carry a first offset.

In an example, the second message includes a second sub-TLV, a third sub-TLV or a fourth sub-TLV;

The second sub-TLV is to carry an index of a link SID of a peer-to-peer P2P adjacency type; the second sub-TLV comprises a block identity field, an index quantity field, an index length field, at least one index field and an endpoint behavior field corresponding to each index field; the third sub-TLV is to carry an index of a link SID of a local area network LAN adjacency type; the third sub-TLV comprises a block identity field, an index quantity field, an index length field, at least one index field and an endpoint behavior field corresponding to each index field; the fourth sub-TLV is to carry an index of a device SID; the fourth sub-TLV comprises a block identity field, an index quantity field, an index length field, at least one index field and an endpoint behavior field corresponding to each index field; wherein the block identity field is to carry the second Block Identity; the index quantity field is to carry an index quantity; the index length field is to carry an index length; each index field is to carry one index value; each endpoint behavior field is to carry an endpoint behavior corresponding to one index value.

In an example, the second sub-TLV further includes an offset field, the third sub-TLV further includes an offset field, and the fourth sub-TLV further includes an offset field, which is to carry a first offset.

In an example, the first message further includes endpoint behavior quantity and endpoint behaviors; the first index value is a start index value, and the start index value is the index value corresponding to a first endpoint behavior included in the first message; said calculating the first SID by using a boundary address of a first address space corresponding to a same Block and the first index value specifically includes:

calculating an index value corresponding to each endpoint behavior included in the first message according to the endpoint behavior quantity and the start index value;

calculating an SID corresponding to each endpoint behavior respectively, based on the boundary address of the first address space and the index value corresponding to each endpoint behavior included in the first message.

In an example, the first message includes a fifth sub-TLV, and the fifth sub-TLV includes a block identity field, a Start SID field, an End SID field, a flags field, an algorithm field, a weight field, a behavior quantity field and an endpoint behavior field; wherein the block identity field is to carry the first Block Identity; the Start SID field is to carry a start address of the first address space; the End SID field is to carry an end address of the first address space; the flags field is to carry shared flags, and the shared flags are shared by a plurality of SIDs included in a Block characterized by the first Block Identity; the algorithm field is to carry a shared algorithm, and the shared algorithm is shared by a plurality of SIDs included in the Block characterized by the first Block Identity; the weight field is to carry a shared weight, and the shared weight is shared by a plurality of SIDs included in the Block characterized by the first Block Identity; the behavior quantity field is to carry the endpoint behavior quantity; each endpoint behavior is to carry one endpoint behavior.

In an example, the fifth sub-TLV further includes an offset field, wherein the offset field is to carry the first offset.

In an example, the second message includes the sixth sub-TLV or the seventh sub-TLV;

The sixth sub-TLV is to carry an index of a link SID of a peer-to-peer P2P adjacency type; the sixth sub-TLV comprises a block identity field, an index length field and a start index field;

The seventh sub-TLV is to carry an index of a link SID of a local area network LAN adjacency type; the seventh sub-TLV comprises a block identity field, an index length field and a start index field; wherein the block identity field is to carry the second Block Identity; the index length field is to carry a length of the start index field; the start index field is to carry the start index value.

In an example, the sixth sub-TLV further includes an offset field, and the seventh sub-TLV further includes an offset field, wherein the offset field is to carry the first offset.

In the second aspect, an example of the present disclosure provides an electronic device, wherein the electronic device is a first device in an SRv6 network, and the SRv6 network further includes a second device, wherein the first device and the second device are neighbor devices to each other, and the second device stores a first Segment Identity SID, and the electronic device includes a processor; transceiver; a machine-readable storage medium storing machine executable instructions that may be executed by the processor; the machine executable instructions cause the processor to perform the following blocks:

receiving a first message and a second message sent by the second device through the transceiver; wherein the first message comprises at least one first Block Identity and a boundary address of an address space corresponding to each first Block Identity; the second message comprises at least one second Block Identity and a first index value;

calculating the first SID by using a boundary address of a first address space corresponding to a same Block and the first index value, wherein the same Block is a Block characterized by a same Block Identity in the at least one first Block Identity and the at least one second Block Identity.

In a third aspect, an example of the present disclosure further provides a machine-readable storage medium, which stores machine executable instructions that may be executed by the processor, and the machine executable instructions cause the processor to implement any of the above-mentioned blocks of the method for determining a Segment Identity.

In a fourth aspect, an example of the present disclosure further provides a computer program product containing instructions, which, when running on a computer, cause the computer to perform any of the above-mentioned blocks of the method for determining a Segment Identity.

In the technical solution provided by the examples of the present disclosure, compared with that the process of issuing SIDs needs to carry complete SIDs in the related technology, in the examples of the present disclosure, the first message and the second message sent by the second device to the first device do not include the first SID stored in the second device, but the Block Identity of the Block to which the stored SID belongs, and the boundary address of the first address space of the Block and the index value corresponding to the SID are sent to the first device. Therefore, when there are more devices in the SRv6 network, each device may make its neighbor device accurately determine the SID issued by the device according to the information included in the first message and the second message by sending the first message and the second message to its neighbor devices. In addition, the data amount corresponding to the Block Identity included in the first message and the Block Identity and index value included in the second message is obviously smaller than the data amount corresponding to the complete SID, therefore, when there are a large number of SIDs that need to be issued in SRv6 network, the method provided by the examples of the present disclosure may obviously reduce the data amount of information that the message needs to carry, thereby reducing the number of messages that need to be sent, which effectively reduces the overhead of messages in the process of issuing SIDs, thus ensuring the performance of devices and the stability of message transmission protocol.

Of course, it is not necessary to achieve all the advantages mentioned above at the same time to implement any product or method of the present disclosure.

BRIEF DESCRIPTION OF THE DRAWINGS

FIG. 1-a is a schematic diagram of SRv6 End SID sub-TLV;

FIG. 1-b is a schematic diagram of SRv6 End.X SID sub-TLV;

FIG. 1-c is a schematic diagram of SRv6 LAN End.X SID sub-TLV;

FIG. 2 is a first schematic flowchart of a method for determining a Segment Identity provided by an example of the present disclosure;

FIG. 3 is a schematic structural diagram of SRv6 network provided by an example of the present disclosure;

FIG. 4 is a second schematic flowchart of a method for determining a Segment Identity provided by an example of the present disclosure;

FIG. 5 is a schematic diagram of SID;

FIG. 9 is a sixth schematic flowchart of a method for determining a Segment Identity provided by an example of the present disclosure;

FIG. 10-a is a schematic diagram of SRv6 SID Block sub-TLV provided by an example of the present disclosure;

FIG. 10-b is a schematic diagram of SRv6 End.X SID Index Sub-TLV provided by an example of the present disclosure;

FIG. 10-c is a schematic diagram of SRv6 LAN End.X SID Index Sub-TLV provided by an example of the present disclosure;

FIG. 10-d is a schematic diagram of SRv6 End SID Index Sub-TLV provided by an example of the present disclosure;

FIG. 12-a is another schematic diagram of Rule-based End.X SID Block sub-TLV provided by an example of the present disclosure;

FIG. 12-b is another schematic diagram of Rule-based End.X SID Index sub-TLV provided by an example of the present disclosure;

FIG. 12-*c* is another schematic diagram of Rule-based LAN End.X SID Index sub-TLV provided by the example of the present disclosure;

FIG. 13-*a* is a first schematic structure diagram of a Segment Identity apparatus provided by an example of the present disclosure;

FIG. 13-*b* is a second schematic structural diagram of a Segment Identity apparatus provided by an example of the present disclosure;

FIG. 14 is a schematic structural diagram of a device provided by an example of the present disclosure.

DETAILED DESCRIPTION

Figure 6:
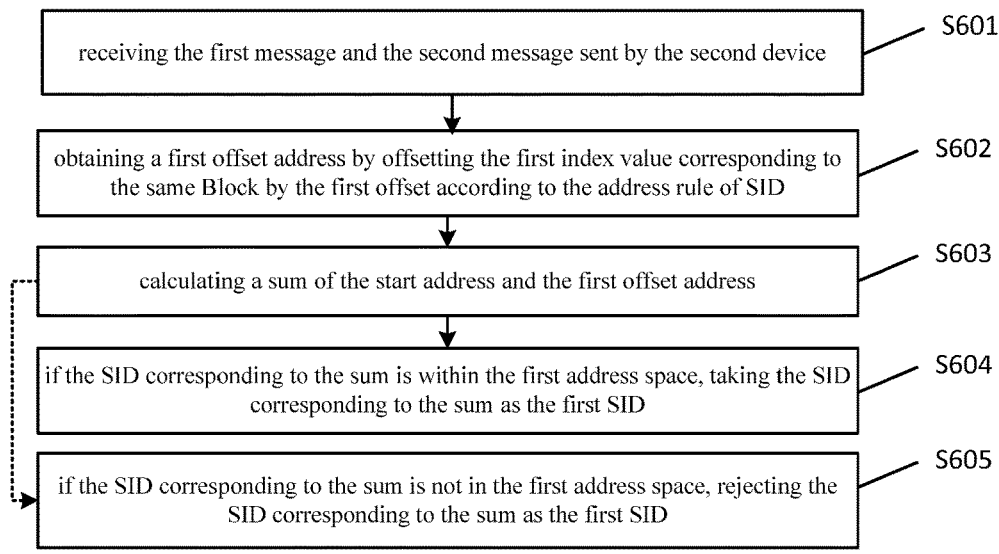
FIG. 6 is a third schematic flowchart of a method for determining a Segment Identity provided by an example of the present disclosure.

In SRv6 network, SID information may be issued between two adjacent devices through Intermediate System-to-Intermediate System (IS-IS) protocol or Open Shortest Path First Version 3 (OSPFv3) protocol. However, in SRv6 network, the number of devices is very large, and the length of one SID reaches 128 bits, this results in a large number of link-state messages sent between devices during the process of issuing SIDs, and each link-state message contains a large amount of data, which leads to a large overhead of message during the process of issuing SIDs, which seriously affects the performance of devices and the stability of message transmission protocol.

For the sake of understanding, take that a device 1 in SRv6 network sends SID to a device 2 based on IS-IS protocol as an example. Among them, device 1 and device 2 are neighbor devices to each other.

In SRv6 network, when the device 1 issues the SID, it will send a link state message including the complete SID to all its corresponding neighboring devices. This SID may be a device SID of device 1 (denoted as End SID). The SID may also be a link SID between the device 1 and its neighboring device (denoted as End.X SID). The link SID is a SID corresponding to an outgoing interface during message transmission. That is, the SID corresponding to the link in the process of message transmission.

When the above-mentioned SID is the device SID, the device 1 may send a link state message (denoted as a first link state message to distinguish) to the device 2. The first link status message carries SRv6 End SID sub-TLV. In which SRv6 End SID sub-TLV is to issue the device SID. Specifically, as shown in FIG. 1-*a*, FIG. 1-*a* is a schematic diagram of SRv6 End SID sub-TLV.

In the SRv6 End SID sub-TLV shown in FIG. 1-*a*, besides the commonly used fields such as Type, Length, Flags field, Endpoint Behavior and so on, it further includes a SID field, which is to fill in the device SID corresponding to the device. For example, the 128-bit value in the SID field in FIG. 1-*a*.

When the above-mentioned SID is a link SID between devices, the device 1 may send a link state message to the device 2 (for the sake of distinguishing, it is denoted as a second link state message). The second link state message carries SRv6 End.X SID sub-TLV or SRv6 LAN End.X SID sub-TLV. SRv6 End.X SID sub-TLV is to issue the link SID of Peer-to-Peer (P2P) adjacency type, and SRv6 LAN End.X SID sub-TLV is to issue link SID of Local Area Network (LAN) adjacency type. Specifically, as shown in FIG. 1-*b* and FIG. 1-*c*, FIG. 1-*b* is a schematic diagram of SRv6 End.X SID sub-TLV, and FIG. 1-*c* is a schematic diagram of SRv6 LAN End.X SID sub-TLV.

In SRv6 End.X SID sub-TLV shown in FIG. 1-*b* and SRv6 LAN End.X SID sub-TLV shown in FIG. 1-*c*, besides the commonly used fields such as Type, Length, Flags field, Algorithm, Weight and so on, it further includes the SID field, which is to fill in the link SID between devices. For example, the 128-bit value in the SID field in FIG. 1-*b* or the 128-bit value in the SID field in FIG. 1-*c*.

In the above, when the device 1 sends the second link state message carrying the link SID to device 2, it may determine whether the second link state message carries SRv6 End.X SID sub-TLV or SRv6 LAN End.X SID sub-TLV according to the method of establishing a neighbor relationship between the device 1 and the device 2. For example, when the device 1 and device 2 are P2P neighbors, the device 1 sends a second link state message carrying SRv6 End.X SID sub-TLV to the device 2. For example, when device 1 and device 2 are LAN neighbors, the device 1 sends a second link state message carrying SRv6 LAN End.X SID sub-TLV to the device 2.

SID issuing based on OSPFv3 is also realized by sending link state messages carrying SRv6 End SID sub-TLV, SRv6 End.X SID sub-TLV or SRv6 LAN End.X SID sub-TLV, the difference lies in that the commonly used fields corresponding to SRv6 End SID sub-TLV, SRv6 End.X SID sub-TLV or SRv6 LAN End.X SID sub-TLV in the link state messages sent by the two protocols are different. For example, the type field in the link state message carrying SRv6 End SID sub-TLV sent based on IS-IS protocol accounts for 8 bits, while the type field in the link state message carrying SRv6 End SID sub-TLV sent based on OSPFv3 accounts for 16 bits. The process of issuing SID based on OSPFv3 may refer to the process of issuing SID based on IS-IS protocol, which will not be described in detail here. For the sake of understanding, the following description will only take the SID issuing process based on IS-IS protocol as an example.

In the process of issuing SIDs of related technologies, the link state message must carry a complete SID, that is, a 128-bit SID whether based on IS-IS protocol or OSPFv3, at this time, the data amount in the link state message is large, and the number of SIDs of each device and link SIDs between every two neighboring devices in SRv6 network may be multiple, as a result, the number of link-state messages to be sent in the process of issuing SIDs is large, and the data amount in each link state message is large, which leads to a large overhead of message in the process of issuing SIDs, which affects the performance of devices and the stability of IS-IS protocol or OSPFv3.

In order to solve the problems in related technologies, an example of the present disclosure provides a method for determining a Segment Identity. As shown in FIG. 2, which is a first schematic flowchart of a method for determining a Segment Identity provided by an example of the present disclosure. The method is applied to a first device in the SRv6 network, which further includes a second device, wherein the first device and the second device are neighbor devices to each other, and a first SID is stored in the second device. The method specifically includes the following blocks.

S201, receiving a first message and a second message sent by the second device; the first message includes at least one first Block Identity and a boundary address of an address space corresponding to each first Block; the second message includes at least one second Block Identity and a first index value.

The first message and the second message in the present disclosure example may both be link state messages, for example, in the process of issuing SID based on IS-IS protocol, the link state message may be a Link State Packet (LSP); in the process of issuing SID based on OSPF protocol, the link state message may be LSA message. If the method of the example of the present disclosure is applied to other networking, appropriate messages may also be selected as the first message and the second message according to the protocol regulations followed by other networking.

S202, calculating the first SID by using a boundary address of a first address space corresponding to a same Block and the first index value, wherein the same Block is a Block characterized by a same Block Identity in the at least one first Block Identity and the at least one second Block Identity.

The above SRv6 network may include multiple devices. The first device may be any device in the SRv6 network. The first device may have one or more neighboring devices. The second device is any of the neighboring devices of the first device. Here, the first device and the second device are not specifically limited. For the sake of understanding, the following description will only take the first device and the second device in SRv6 network as examples.

With the method shown in FIG. 2, after receiving the first message and the second message sent by the second device, the first device may use the boundary address of the first address space and the first index value of the same Block to calculate the first SID issued by the second device. Compared with the process of issuing SIDs needs to carry complete SIDs in the related technology, in the example of the present disclosure, the first message and the second message sent by the second device to the first device do not include the first SID stored in the second device, but the Block Identity of the Block to which the stored SID belongs, and the boundary address of the first address space of the Block and the index value corresponding to the SID are sent to the first device. Therefore, when there are more devices in the SRv6 network, the way that each device sends the first message and the second message to its neighbor devices, may make its neighbor device accurately determine the SID issued by the device according to the information included in the first message and the second message. In addition, the data amount corresponding to the Block Identity included in the first message and the Block Identity and index value included in the second message is obviously smaller than the data amount corresponding to the complete SID, therefore, when there are a large number of SIDs that need to be issued in SRv6 network, the method provided by the example of the present disclosure may obviously reduce the data amount of information that the message needs to carry, thereby reducing the number of messages that need to be sent, which effectively reduces the overhead of messages in the process of issuing SIDs, thus ensuring the performance of devices and the stability of message transmission protocol.

For the block S201, that is, receiving a first message and a second message sent by a second device; wherein, the first message includes at least one first Block Identity and the boundary address of the address space corresponding to each first Block Identity; the second message includes at least one second Block Identity and the first index value.

In this block, the first SID is stored in the second device. When the second device issues the SID, it may send the first message and the second message to its neighbor devices. The neighbor devices of the second device may both receive the first message and the second message. That is, the first device may receive the first message and the second message sent by the second device.

The above-mentioned first message may be a link state message (denoted as a third link state message to distinguish, and in the following examples, the first message is the third link state message as an example for description), and the first message may include the first sub-TLV, which may be the SRv6 SID Block sub-TLV included in the link state message. In which SRv6 SID Block sub-TLV is a Type-Length-Value (TLV) of SRv6 Locator TLV. That is, the sub-TLV of SRv6 Locator TLV includes SRv6 SID Block sub-TLV. SRv6 SID Block sub-TLV is to issue information about the block to which SID belongs. According to the current protocol, SRv6 Locator TLV is included in the link state message, and the first sub-TLV in the example of the present disclosure is the sub-TLV of SRv6 Locator TLV, but it is not limited in the example of the present disclosure, and the first sub-TLV may also be the sub-TLV of other TLV included in the first message.

The above-mentioned second message may be a link state message (for the sake of distinguishing, it is denoted as the fourth link state message, and in the following examples, the second message is the fourth link state message as an example for description), and the second message may include the second sub-TLV, the third sub-TLV or the fourth sub-TLV. The second TLV is SRv6 End.X SID Index Sub-TLV, the third TLV is SRv6 LAN End.X SID Index Sub-TLV, and the fourth TLV is SRv6 End SID Index Sub-TLV. SRv6 End.X SID Index Sub-TLV is to issue relevant information corresponding to link SID of P2P adjacency type, SRv6 LAN End.X SID Index Sub-TLV is to issue relevant information corresponding to link SID of LAN adjacency type, and SRv6 End SID Index Sub-TLV is to issue relevant information corresponding to device SID.

In the fourth link status message, the parent TLV of SRV end. X SID index sub-TLV and SRv6 LAN End.X SID Index Sub-TLV includes but is not limited to Extended IS Reachability TLV (also denoted as TLV-22), IS Neighbor Attribute TLV (also denoted as TLV-23), L2 Bundle Member Attributes TLV (also denoted as TLV-25), inter-as adaptability information TLV (also denoted as TLV-141), MT-ISN TLV (also denoted as TLV-222), MT IS Neighbor Attribute TLV (also denoted as TLV-223). The parent TLV of SRv6 End SID Index Sub-TLV is SRv6 Locator TLV. According to the current protocol, the second sub-TLV and the third sub-TLV in the example of the present disclosure may be the sub-TLVs of the above-mentioned TLV-22, TLV-23, TLV-25, TLV-141, TLV-222 or TLV-223, and the fourth sub-TLV may be the sub-TLV of SRv6 Locator TLV. However, the example of the present disclosure is not limited to this, and the second sub-TLV, the third sub-TLV and the fourth TLV may also be taken as sub-TLVs of other TLVs included in the second message.

The first device, after receiving the above-mentioned third link state message and the fourth link state message, may determine devices corresponding to the SIDs issued by the first message and the second message according to the information included in the parent TLV corresponding to the SRv6 SID Block sub-TLV in the third link state message, and SRv6 End.X SID Index Sub-TLV, SRv6 LAN End.X SID Index Sub-TLV or SRv6 End SID Index Sub-TLV in the fourth link state message.

For the sake of understanding, two neighboring devices, namely device 1 and device 2, will be taken as examples. When device 1 sends the first message and the second message corresponding to the link SID between device 1 and another neighboring device (such as device 3) to device 2, device 2 will receive the third link state message carrying SRv6 SID Block sub-TLV and the fourth link state message carrying SRv6 LAN End.X SID Index Sub-TLV sent by device 1. At this time, device 2 may determine the devices corresponding to the first message and the second message sent by device 1, namely device 1 and device 3 according to the information in the parent TLV (namely the above-mentioned SRv6 Locator TLV) corresponding to SRv6 SID Block sub-TLV in the received third link state message and the information in the parent TLV (such as the above-mentioned TLV-22) corresponding to SRv6 LAN End.X SID Index Sub-TLV in the fourth link state message.

The above-mentioned SRv6 SID Block sub-TLV, SRv6 End.X SID Index Sub-TLV, SRv6 LAN End.X SID Index Sub-TLV and SRv6 End SID Index Sub-TLV may be described below, and will not be specifically described here.

In the example of the present disclosure, the number of the first SIDs stored in the second device may be one or multiple. When the number of first SIDs stored in the second device is multiple, the first SID may include the device SID of the second device and the link SID between the second device and its neighbor devices, and if multiple first SIDs stored in the second device belong to different Blocks, the first message and the second message may include the Block Identity of the Block to which each first SID belongs.

The neighboring devices of the second device at least include the above-mentioned first device, and in addition, other neighboring devices may be included. The neighboring devices of the second device are not specifically limited here.

For the sake of understanding, take FIG. 3 as an example to explain. FIG. 3 is a schematic structural diagram of SRv6 network provided by an example of the present disclosure.

Now, it is assumed that the above-mentioned second device is device 2 in FIG. 3 and the first device is device 3 in FIG. 3. The first SID is stored in the device 2. The first SID may include a device SID and link SIDs. The device SID is the device SID of device 2; the link SIDs may include the link SID between device 1 and device 2, and the link SID between device 2 and device 3.

In the example of the present disclosure, each device in the SRv6 network may have one or more device SIDs, and there may be one or more link SIDs between every two adjacent devices. Here, the types of SIDs included in the first SIDs and the number of first SIDs are not specifically limited. For the sake of understanding, the following will only take that issuing the first SID as an example for description, without any limitation.

In an example, when the first SID stored by the second device includes a device SID, the SRv6 SID Block sub-TLV in the third link state message carries the Block Identity corresponding to the device SID and the boundary address of the first address space corresponding to the block Identity. The SRv6 End SID Index Sub-TLV in the fourth link state information carries the Block Identity corresponding to the device SID and the first index value.

In another example, when the first SID stored by the second device includes a link SID, the SRv6 SID Block sub-TLV in the third link status message carries the Block Identity corresponding to the link SID and the boundary address of the first address space corresponding to the block Identity. SRv6 End.X SID Index Sub-TLV or SRv6 LAN End.X SID Index Sub-TLV in the fourth link state information carries the Block Identity corresponding to the link SID and the first index value.

For the fourth link state message, when the first SID stored by the second device is the link SID, if the second device and the first device are P2P neighbors, the fourth link state message carries SRV 6 End. X SID Index Sub-TLV; if the second device and the first device are LAN neighbors, the fourth link status message carries SRv6 LAN End.X SID Index Sub-TLV.

In the example of the present disclosure, sub-TLV carried in the fourth link state message is different according to the different categories corresponding to the first SID and the different adjacency types between the first device and the second device. Here, sub-TLV carried in the fourth link status message is not specifically limited.

In the example of the present disclosure, the first message and the second message may be the same message or different messages. For example, when the first message is the third link state message and the second message is the fourth link state message, the third link state message and the fourth link state message may be the same link state message or different link state messages. Here, the third link state message and the fourth link state message are not specifically limited.

In the example of the present disclosure, the above first message includes the first Block Identity of the first Block to which the first SID belongs, the boundary address of the first address space corresponding to the first Block, and a first offset. The above second message includes the second Block Identity of the second Block and the first index value corresponding to the first SID.

Since the first SID may be a device SID or a link SID, at least one first Block Identity included in the first message and at least one second Block Identity included in the second message may have the same Block Identity or different Block Identities.

The address space corresponding to the first Block may be expressed as the value range of the SID corresponding to the first Block. The above Block may be divided according to the preset rules, and the specific division method may be described below, which will not be described here.

For the above block S202, the first SID is calculated by using the boundary address of the first address space and the first index value corresponding to the same Block. In the example of the present disclosure, after receiving the first message and the second message sent by the second device, the first device obtains the same Block Identity from at least one first Block Identity and at least one second Block Identity, and then determines the boundary address of the first address space and the first index value corresponding to the same Block Identity to represent the same first SID.

The first message may include one or more first Block Identities, and the second message may include one or more second Block Identities.

When the first message includes one first Block Identity and the second message includes one second Block Identity, after receiving the first message and the second message sent by the second device, the first device may determine whether the first Block Identity included in the first message and the second Block Identity included in the second message characterize the same Block, that is, determine whether the first Block Identity included in the first message is the same as the second Block Identity included in the second message, so as to determine whether the SID corresponding to the first message and the SID corresponding to the second message are the same one.

In one example, when the first Block Identity included in the first message is the same as the second Block Identity included in the second message, that is, the first Block Identity and the second Block Identity characterize the same Block, the first device may determine that the SID corresponding to the first Block Identity and the SID corresponding to the second Block Identity are the same one, that is, the first SID. At this time, the first device may perform the above block S202, that is, the first device may determine the SID, that is, the first SID, according to the boundary address of the first address space included in the first message and the first index value included in the second message. The specific determination method of the above-mentioned first SID may be referred to the following description, which will not be specifically described here.

In the example of the present disclosure, SID is an Internet Protocol Version 6 (IPv6) address of 128 bits. The address space to which the first Block belongs is specifically expressed as the SID value range corresponding to the first Block (that is, IPv6 address value range). The boundary address of the first address space may be a Start SID and an ending SID in the SID value range corresponding to the first address space. For example, the start address in the boundary address of the first address space may be a Start SID in the SID value range corresponding to the first address space. For example, the boundary address of the first address space may be an End SID in the SID value range corresponding to the first address space.

In another example, for one first message received by the first device, if a second message which has the same Block Identity as that in the first message is not found, that is, the boundary address of the first address space needed for calculating SID is missing, the first device will discard the first message.

For one second message received by the first device, if a first message which has the same Block Identity as that in the second message is not found, that is, the first index value needed for calculating SID is missing, the first device will discard the second message.

In an example, considering the influence of the network environment on the link status messages between the first device and the second device, when the first device does not find a first message or a second message with the same Block Identity, it may wait for a preset time, if a first message and a second message with the same Block Identity are not found after the preset time, the first device may discard the received second message or the first message.

In an example, after receiving the first message and the second message, the first device may forward the received first message and second message (such as the third link state message and the fourth link state message). The neighbor node of the first device may determine the first SID issued by the second device according to the received first message and second message.

In the example of the present disclosure, the first message further includes a first offset, or the second message further includes a first offset. Based on this, the above block S202 may be specifically implemented as follows:

calculating the first SID according to the boundary address of the first address space, the first offset and the first index value.

In an example, when the boundary address of the first address space is the Start address of the first address space, according to the method shown in FIG. 2, the example of the present disclosure also provides a method for determining the Segment Identity. As shown in FIG. 4, which is a second schematic flowchart of a method for determining a Segment Identity provided by an example of the present disclosure. The method includes the following blocks.

S401, receiving the first message and the second message sent by the second device.

The first message includes at least one first Block Identity, a boundary address of the address space corresponding to each first Block Identity and a first offset; the second message includes at least one second Block Identity and a first index value.

Or, the first message includes at least one first Block Identity and the boundary address of the address space corresponding to each first Block Identity; the second message includes at least one second Block Identity, a first index value and a first offset.

S402, obtaining a first offset address by offsetting the first index value corresponding to the same Block by the first offset according to an address rule of SID.

The same Block is a Block characterized by the same Block in at least one first Block Identity and at least one second Block Identity.

In this block, when one first Block Identity included in the first message and one second Block Identity included in the second message represent the same Block, the first device may offset the first index value included in the second message according to the address rule of SID based on the first offset to obtain the first offset address. That is, the first offset address is obtained by offsetting the first index value.

In SRv6 network, device SID or link SID consists of Locator, Function and Arguments, as shown in FIG. 5, which is a schematic diagram of SID.

The Locator is to identify the network segment to which the SID belongs. Locator is unique within Segment Routing (SR) domain. Function is to identify a local operation instruction bound with SID, after receiving the traffic, the designated node in SR domain performs related operations according to the Function field of SID. Arguments are to define information such as the flow and service of a message.

For example, the first index value is 1 and the first offset is 16, at this time, according to the address rule of SID, offset the first index value by the first offset, which may be expressed as the address obtained by shifting the first index value to the left by 16 bits, that is, the address 0::1:0. That is, the first offset address is 0::1:0.

In the example of the present disclosure, the above address rule of SID may be determined according to the number of bits corresponding to Locator, Function and Arguments included in the SID.

S403, calculating the first SID according to the start address and the first offset address.

In this block, the first device may calculate the first SID corresponding to the first message and the second message according to the first offset address obtained by the offset processing and the boundary address of the first address space included in the first message (that is, the start address of the first address space). The calculation method of the first SID may be described below, which will not be specifically described here.

The above block S402-S403 is a refinement of the above block S202.

Through the above blocks S402-S403, in the process of issuing a large number of SIDs, the device uses the above first offset to offset the first index value to obtain the first offset address, according to the first offset address and the boundary address of the first address space, the device can accurately calculate the SIDs corresponding to the received first message and the second message, that is, the SIDs issued by the second device in SRv6 network, which reduces the amount of data included in the link state message while realizing the issuance and calculation of SID, and ensures the accuracy of the calculated SID, thus ensuring the accuracy of the issued SID.

In an example, according to the method shown in FIG. 4 above, the example of the present disclosure also provides a method for determining a Segment Identity. As shown in FIG. 6, FIG. 6 is a third schematic flowchart of a method for determining a Segment Identity provided by the example of the present disclosure. The method includes the following blocks.

S601, receiving the first message and the second message sent by the second device.

The first message includes at least one first Block Identity, the boundary address of the address space corresponding to each first Block Identity and a first offset; the second message includes at least one second Block Identity and a first index value.

Or, the first message includes at least one first Block Identity and the boundary address of the address space corresponding to each first Block Identity; the second message includes at least a second Block Identity, a first index value and a first offset.

S602, obtaining a first offset address by offsetting the first index value corresponding to the same Block by the first offset according to the address rule of SID.

The above blocks S601-S602 are the same as the above blocks S401-S402.

S603: calculating a sum of the start address and the first offset address.

In this block, the first device may sum the start address of the first address space and the first offset address to obtain the sum of the start address and the first offset address.

In an example, after calculating the sum of the start address and the first offset address, the first device may take the sum as the SID corresponding to the first message and the second message, that is, the above-mentioned first SID.

In another example, considering that the third link state message and the fourth link state message may have transmission errors during transmission, in order to ensure the accuracy of the determined first SID, the first device may determine whether the SID corresponding to the sum of the calculated start address and the first offset address is within the first address space. That is, it is to determine whether the SID corresponding to the sum of the calculated start address and the first offset address is within the SID value range corresponding to the first address space. If it is within the first address space, block S604 is executed. If it is not within the first address space, block S605 is executed.

In an example, when determining whether the SID corresponding to the sum of the start address and the first offset address is in the first address space, it may specifically be expressed as: determining whether the sum of the start address and the first offset address is greater than or equal to the start address of the first address space and less than or equal to the end address of the first address space. When the sum of the start address and the first offset address is greater than or equal to the start address of the first address space and less than or equal to the end address of the first address space, it is determined that the SID corresponding to the sum is within the first address space. When the sum of the start address and the first offset address is less than the start address of the first address space or greater than the end address of the first address space, it is determined that the SID corresponding to the sum is not within the first address space.

In the example of the present disclosure, the sum of the start address and the first offset address is expressed as an IPV6 address, and the SID corresponding to IPv6 is expressed as the sum itself.

S604, if the SID corresponding to the sum is within the first address space, taking the SID corresponding to the sum as the first SID.

The above-mentioned blocks S603-S604 are a refinement of the above-mentioned block S403.

S605: if the SID corresponding to the sum is not in the first address space, rejecting the SID corresponding to the sum as the first SID.

In this block, when the SID corresponding to the sum of the calculated start address and the first offset address is not in the first address space, the first device may determine that the calculated sum is wrong. At this time, the first device may reject to take the SID corresponding to the sum as the first SID.

By determining whether the SID corresponding to the sum of the start address and the first offset address is within the first address space, it is possible to effectively detect whether the calculated sum is wrong, thus avoiding taking the SID corresponding to the wrong sum as the first SID and ensuring the accuracy of the obtained first SID, thus providing guarantee for the later message forwarding process based on SID.

Figure 7:
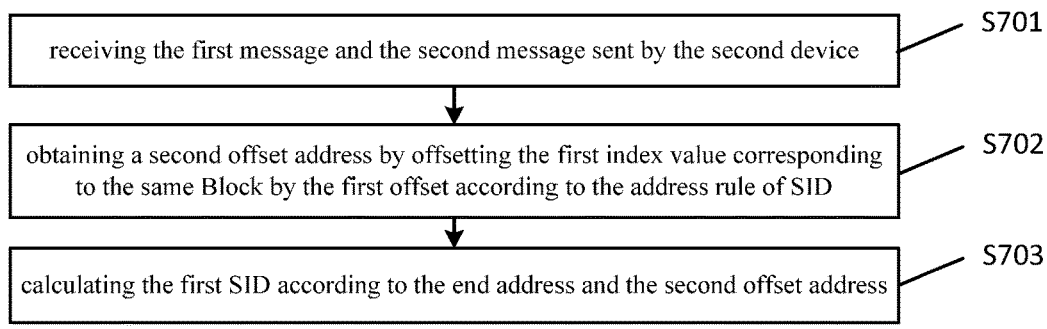
FIG. 7 is a fourth schematic flowchart of a method for determining a Segment Identity provided by an example of the present disclosure.

In an example, when the boundary address of the first address space is the end address of the first address space, according to the method shown in FIG. 2, an example of the present disclosure also provides a method for determining the Segment Identity. As shown in FIG. 7, FIG. 7 is a fourth schematic flowchart of a method for determining a Segment Identity provided by the example of the present disclosure. The method includes the following blocks.

S701, receiving the first message and the second message sent by the second device.

The first message includes at least one first Block Identity, the boundary address of the address space corresponding to each first Block Identity and a first offset; the second message includes at least one second Block Identity and a first index value.

Or, the first message includes at least one first Block Identity and the boundary address of the address space corresponding to each first Block Identity; the second message includes at least a second Block Identity, a first index value and a first offset.

S702, obtaining a second offset address by offsetting the first index value corresponding to the same Block by the first offset according to the address rule of SID.

Wherein, the same Block is a Block characterized by the same Block in at least one first Block Identity and at least one second Block Identity.

The acquisition method of the second offset address may refer to the acquisition method of the first offset address, which will not be repeated here.

S703, calculating the first SID according to the end address and the second offset address.

In this block, the first device may calculate the first SID corresponding to the first message and the second message according to the second offset address obtained by the offset processing and the boundary address of the first address space included in the first message (that is, the end address of the first address space). The calculation method of the first SID may be described below, which will not be specifically described here.

The above blocks S702-S703 are refinement of the above block S202.

Figure 8:
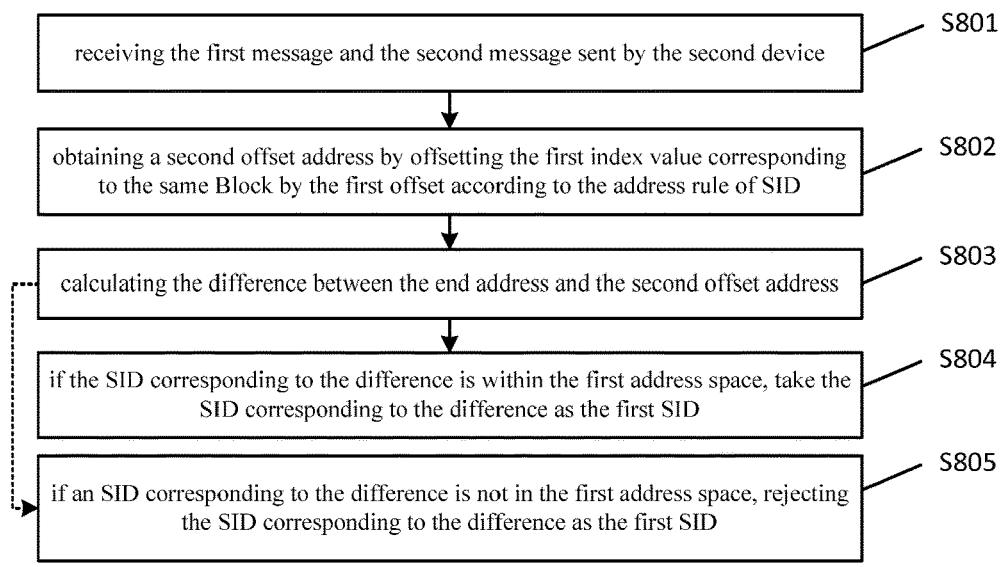
FIG. 8 is a fifth schematic flowchart of a method for determining a Segment Identity provided by an example of the present disclosure.

In an example, according to the method shown in FIG. 7, an example of the present disclosure also provides a method for determining a Segment Identity. As shown in FIG. 8, FIG. 8 is a fifth schematic flowchart of a method for determining a Segment Identity provided by the example of the present disclosure. The method includes the following blocks.

S801, receiving the first message and the second message sent by the second device.

The first message includes at least one first Block Identity, the boundary address of the address space corresponding to each first Block Identity and a first offset; the second message includes at least one second Block Identity and a first index value.

Or, the first message includes at least one first Block Identity and the boundary address of the address space corresponding to each Block; the second message includes at least a second Block Identity, a first index value and a first offset.

S802, obtaining a second offset address by offsetting the first index value corresponding to the same Block by the first offset according to the address rule of SID.

The above-mentioned blocks S801-S802 are the same as the above-mentioned blocks S701-S702.

S803, calculating the difference between the end address and the second offset address.

In this block, the first device may calculate the difference between the end address of the first address space and the second offset address to obtain the difference between the end address and the second offset address.

In an example, after calculating the difference between the end address and the second offset address, the first device may determine the difference as the SID corresponding to the first message and the second message, that is, the above first SID.

In another example, considering that the third link state message and the fourth link state message may have transmission errors during transmission, in order to ensure the accuracy of the determined first SID, the first device may determine whether the SID corresponding to the calculated difference between the end address and the second offset address is within the first address space. That is, it is to determine whether the SID corresponding to the calculated difference between the end address and the second offset address is within the SID value range corresponding to the first address space. If it is within the first address space, block S804 is executed. If it is not in the first address space, block S805 is executed.

The method of determining whether the SID corresponding to the difference between the end address and the second offset address is within the first address space may refer to the method of determining whether the SID corresponding to the sum of the start address and the first offset address is within the first address space, which will not be specifically described here.

S804, if the SID corresponding to the difference is within the first address space, take the SID corresponding to the difference as the first SID.

The above-mentioned blocks S803-S804 are refinements of the above-mentioned block S703.

S805, if an SID corresponding to the difference is not in the first address space, rejecting the SID corresponding to the difference as the first SID.

In this block, when the SID corresponding to the calculated difference between the end address and the second offset address is not in the first address space, the first device may determine that the calculated difference is wrong. At this time, the first device may refuse to take the SID corresponding to the difference as the first SID.

By determining whether the SID corresponding to the difference between the end address and the second offset address is within the first address space, it may detect effectively that whether the calculated difference is wrong, thus avoiding taking the SID corresponding to the wrong difference as the first SID and ensuring the accuracy of the obtained first SID, thus providing guarantee for the later message forwarding process based on SID.

In the examples of FIG. 4, FIG. 6-FIG. 8 above, the method of calculating the first SID will be explained only by taking the start address and the end address in the first address space as examples. In addition, the first device may also calculate the first SID issued by the second device according to any address except the start address and the end address in the first address space.

For the sake of understanding, take the method of calculating the first SID according to any address (address A) except the start address and the end address in the first address space as an example. At this time, the first offset may include sign bits indicating positive and negative, for example, a sign bit value of 0 indicates positive number, and a sign bit value of 1 indicates negative number. After the first device offsets the index value by the first offset according to the address rule of SID to obtain the offset address, it may calculate the sum or difference between address A and the offset address according to the sign bit of the first offset, so as to obtain the first SID. For example, when the sign bit of the first offset indicates a positive number, the first device may calculate the sum of address A and the offset address to obtain the first SID; when the sign bit of the first offset represents a negative number, the first device may calculate the difference between the address A and the offset address to obtain the first SID.

In the example of the present disclosure, the address in the first address space used during the process for calculating the first SID is not specifically limited.

In an example, the first device stores a second SID. According to the method shown in FIG. 2, the example of the present disclosure also provides a method for determining the Segment Identity. As shown in FIG. 9, FIG. 9 is the sixth flow diagram of the method for determining the Segment Identity provided by the example of the present disclosure. The method includes the following blocks.

S901, receiving a first message and a second message sent by a second device; the first message includes at least one first Block Identity and a boundary address of an address space corresponding to each first Block Identity; the second message includes a second Block Identity and a first index value.

S902, calculating the first SID by using the boundary address of the first address space corresponding to the same Block and the first index value.

Wherein, the same Block is a Block characterized by the same Block Identity in at least one first Block Identity and at least one second Block Identity.

The above-mentioned blocks S901-S902 are the same as the above-mentioned blocks S201-S202.

S903, obtaining the stored second SID.

The above second SID may include one or more of the device SID of the first device and link SIDs between the first device and its neighbor nodes. Here, the second SID is not particularly limited.

S904, determining a target Block to which the second SID belongs according to the corresponding relationship between respective pre-divided blocks and the address space.

In an example, for each device in SRv6 network, the device may divide a plurality of SID value ranges according to the preset address space dividing rules, and each SID value range is a Block. At this time, the above preset rule is the preset address space division rule.

For ease of understanding, take address spaces 0::100:0 to 0::300:0 as an example. The device may divide the address space into two blocks according to preset rules. For example, the address space corresponding to Block 1 may be: 0::100:0 to 0::200:0, and the address space corresponding to Block 2 may be: 0::201:0 to 0::300:0.

In another example, for each device in SRv6 network, the device may divide a plurality of SID value ranges according to the preset bit division rules, and each SID value range is one Block. At this time, the preset rule is the preset bit division rule.

For the sake of understanding, the division of 4 bits will be taken as an example. The value range of the address space is from 0000 to 1111. The equipment may divide two SID value ranges based on these four bits, that is, two Blocks are obtained by dividing.

For example, the address storage space corresponding to Block A may be from 0000 to 0011, that is, the third bit and the fourth bit are 0. The address storage space corresponding to Block B is 0100-1111. That is, at least one bit in the third bit position and the fourth bit are set to 1.

The above-mentioned Block may be divided according to the preset address space division rule, or may be divided according to the preset bit division rule. Here, the above division method of the Block is not specifically limited.

In the example of the present disclosure, the number of Blocks obtained by each device in the SRv6 network divided according to preset rules may be the same or different; furthermore, the value range of the address space corresponding to each Block may be the same or different. Here, the number of Blocks and address space corresponding to each device in SRv6 network are not specifically limited.

In an example, according to the known communication protocol standard, the Arguments field in the SID is 0. Therefore, when the Block is divided according to the preset rules, the address space to be divided may be determined according to the number of bits in the Arguments field included in the SID. That is to say, the address space with the Arguments field of 0 is selected and divided to obtain one or more Blocks.

In an example, after one or more Blocks are obtained by dividing, each device in the SRv6 network may store a corresponding Block Identity assigned to each Block, that is, the Block ID.

After obtaining the second SID, the above first device may determine the address space (denoted as the second address space) where the second SID is located according to the corresponding relationship between respective pre-divided blocks and the address space, and determine a Block corresponding to the second address space where the second SID is located as the Block to which the second SID belongs, so as to obtain the target Block.

In the above example, the above block S904 is executed after block S903. In addition, the above-mentioned block S904 and the above-mentioned block S901 may be executed simultaneously or the above-mentioned block S904 may be executed before the above-mentioned block S901. Here, the execution order of the above blocks S901 and S904 is not specifically limited.

S905, determining a second index value corresponding to the second SID according to the corresponding relationship between respective SIDs and index values in a second address space corresponding to the target Block.

In the example of the present disclosure, each SID in the second address space corresponding to the target Block has a corresponding index value. After determining the second address space corresponding to the target Block to which the second SID belongs, the first device may determine the index value corresponding to the second SID as the second index value according to the corresponding relationship between respective SIDs and index values in the second address space.

In the example of the present disclosure, the index value corresponding to each SID in the second address space may be determined based on the boundary address of the second address space.

For example, the value range of the SID corresponding to the second address space is 0::100:0 to 0::200:0, and the start address of the second address space is 0::100:0, then the index value corresponding to 0::100:0 may be 0, and the index value corresponding to 0::101:0 may be 1, the index value corresponding to 0::102:0 may be 2, and so on, and the index value corresponding to 0::200:0 may be 256=2*162-162.

For example, the SID value range corresponding to the second address space is still: 0::100:0 to 0::200:0, and the end address of the second address space is: 0::200:0, then the index value corresponding to 0::200:0 may be 0, and the index value corresponding to 0::101:0 may be 1, the index value corresponding to 0::102:0 may be 2, and so on, and the index value corresponding to 0::100:0 may be 256. In the example of the present disclosure, the method for determining the index value corresponding to each SID in the second address space is not specifically limited.

S906, sending a third message and a fourth message to each neighbor device, wherein the third message includes a third Block Identity of the target Block and the boundary address of the second address space, and the fourth message includes a third Block Identity and the second index value.

The first device may send the third message and the fourth message to each of its neighbor devices. After receiving the third and fourth messages, each neighboring device corresponding to the first device may determine the second SID according to the third and fourth messages. The method for determining the second SID may refer to the method for determining the first SID mentioned above, which will not be described in detail here.

In an example, the third message further includes a second offset, in an example, the fourth message further includes a second offset; before the above block S906, and the method may further include: calculating the second offset of the boundary address of the second address space according to the attribute characteristics of each address in the second address space.

In an example, in a known communication protocol standard, the above-mentioned SID includes the Arguments field, and the Arguments field is set on the low address bit of the SID. Furthermore, each bit corresponding to the Arguments field is 0, so the first device may determine all the bits corresponding to the Arguments field as the second offset of the boundary address of the second address space.

In the example of the present disclosure, the attribute characteristics of each address in the second address space may be expressed as the number of bits with a value of 0 on the lower address bits of each address.

The boundary address of the second address space may be a start address or an end address in the second address space, and so on.

In the example of the present disclosure, the first device may also determine the second offset according to the actual needs of users. In one example, the first device selects a first number of address bits as the second offset from the low address bits. The values of the first number may be 10, 20, 30, etc. In another example, the second offset may be 0, and the third message and the fourth message may not carry the second offset when the second offset is 0.

It may be understood that in this example, the second offset is not determined strictly according to the fields included in the existing SID, but some address bits are selected as the second offset according to the actual needs of users. Furthermore, the value corresponding to each selected address bit may be either 0 or 1, and in the example of the present disclosure, the value corresponding to each address bit is not limited.

In the example of the present disclosure, the method for determining the second offset is not specifically limited.

In the example of the present disclosure, the third message may be a link state message (for the sake of distinguishing, it is denoted as a fifth link state message), the third message may include a sub-TLV, and the sub-TLV of the third message may be SRv6 SID Block sub-TLV in the fifth link state message. The above fourth message may be a link state message (for the sake of distinguishing, it is denoted as a sixth link state message), and the fourth message includes a sub-TLV, the sub-TLV of the fourth message may be SRv6 End.X SID Index Sub-TLV, SRv6 LAN End.X SID Index Sub-TLV or SRv6 End SID Index Sub-TLV in the sixth link state message.

In an example, the first device may send the above first message and the second message while sending the third message and the fourth message to its neighbor nodes. Here, the message sent by the first device is not specifically limited.

For ease of understanding, the above-mentioned first sub-TLV to fourth sub-TLV will be described with reference to FIG. 10-*a* to FIG. 10-*d* as an example.

The first sub-TLV includes a block identity field, a Start SID field and an End SID field; the Block identity field is to carry at least one first Block Identity; the Start SID field is to carry the start address of the address space corresponding to each first Block; the End SID field is to carry the end address of the address space corresponding to each first Block.

As an example, the first sub-TLV may be SRv6 SID Block sub-TLV, and FIG. 10-*a* is a schematic diagram of SRv6 SID Block sub-TLV provided by the example of the present disclosure. According to the current protocol, SRv6 SID Block sub-TLV includes type field, length field, Sub-sub-tlv-len field, and Sub-sub-TLVs field. In the example of the present disclosure, in addition to the above fields, SRv6 SID Block sub-TLV further includes a block identity field (Block ID), a Start SID field and an End SID field.

In an example, the SRv6 SID Block sub-TLV may further include an offset field, which may carry a first offset, and the first offset is to represent the offset of the boundary address of the address space corresponding to the block Identity included in the SRv6 SID Block sub-TLV. Taking a block Identity as an example in FIG. 10-*a*, it may be understood that when SRv6 SID Block sub-TLV includes multiple block identities, the first offset may be to represent the offset of the boundary address of the address space corresponding to each block Identity.

In IS-IS protocol, the type field, length field, block identity field, offset field and the sub sub-TLV length field in the SRv6 SID Block sub-TLV may each occupy 8 bits, and the length of the sub sub-TLV field is variable, and the start SID field and the End SID field may each occupy 128 bits. In other protocols, the length of each field and the arrangement order of each field are not limited, which is not limited in the example of the present disclosure.

In an example, the sub-TLV in the third message may also be SRv6 SID Block sub-TLV, in this case, the value of the block identity field of SRv6 SID Block sub-TLV is the third Block Identity in the third message, the value of the offset field is the second offset in the third message, and the values of the Start SID field and the End SID field are the start address and the end address of the second address space, respectively.

The second sub-TLV is to carry an index of the link SID of P2P adjacency type; the second sub-TLV includes a block identity field, an index quantity field, an index length field, at least one index field and an endpoint behavior field corresponding to each index field.

The third sub-TLV is to carry an index of the link SID of LAN adjacency type; the third sub-TLV includes a block identity field, an index quantity field, an index length field, at least one index field and an endpoint behavior field corresponding to each index field.

The fourth sub-TLV is to carry an index of the device SID; the fourth sub-TLV includes a block identity field, an index quantity field, an index length field, at least one index field and an endpoint behavior field corresponding to each index field.

Among the second sub-TLV, the third sub-TLV and the fourth sub-TLV, the Block identity field is to carry the second Block Identity; the index quantity field is to carry the index quantity; the index length field is to carry the index length; the index field is to carry one index value.

As an example, the second sub-TLV may be SRv6 End.X SID Index Sub-TLV, and the third sub-TLV may be SRv6 LAN End.X SID Index Sub-TLV. FIG. 10-*b* is a schematic diagram of SRv6 End.X SID Index Sub-TLV provided by an example of the present disclosure; FIG. 10-*c* is a schematic diagram of SRv6 LAN End.X SID Index Sub-TLV provided by an example of the present disclosure.

According to the current protocol, SRv6 End.X SID Index Sub-TLV and SRv6 LAN End.X SID Index Sub-TLV both include type field, length field, flags field, algorithm field and weight field. In the example of the present disclosure, in addition to the above fields, SRv6 End.X SID Index Sub-TLV further includes a block identity field (Block ID), an Index quantity field (Index Num), an Index Length field, at least one index field and an Endpoint Behavior field corresponding to each index field. If the index quantity field is Num, at least one index field includes Index 0, Index 1, . . . , Index Num−1, and correspondingly, the endpoint behavior field includes Endpoint Behavior 0, Endpoint Behavior 1, . . . , Endpoint Behavior Num−1.

SRv6 End.X SID Index Sub-TLV further includes a neighbor system Identity field (Neighbor System-ID), which occupies a variable number of bits and may be determined based on the neighbor system Identity.

In IS-IS protocol, the type field, length field, flags field, algorithm field, weight field, block identity field, index quantity field, index length field and each endpoint behavior field in SRv6 End.X SID Index Sub-TLV and SRv6 LAN End.X SID Index Sub-TLV may each occupy 8 bits, and the number of bits occupied by each index field is variable. In other protocols, the length of each field and the arrangement order of each field are not limited to this.

In an example, the sub-TLV in the fourth message may also be SRv6 End.X SID Index Sub-TLV. In this case, the value of the block identity field of SRv6 End.X SID Index Sub-TLV is the third Block Identity in the fourth message, and the value of the index field may be the second index value in the fourth message.

Or, the sub-TLV in the fourth message may also be SRv6 LAN End.X SID Index Sub-TLV, in this case, the value of the block identity field of SRv6 LAN End.X SID Index Sub-TLV is the third Block Identity, and the value of the index field may be the second index value in the fourth message.

The Block identities in FIG. 10-b and FIG. 10-c are the identities corresponding to the link SID.

As an example, the fourth sub-TLV may be SRv6 End SID Index Sub-TLV, and FIG. 10-d is a schematic diagram of SRv6 End SID Index Sub-TLV provided by an example of the present disclosure. According to the current protocol, SRv6 End SID Index Sub-TLV includes type field, length field and flags field. In the example of the present disclosure, besides the above fields, SRv6 End SID Index Sub-TLV further includes a block identity field (Block ID), an index quantity field (Index Num), an index length field (Index Length), at least one index field (Index) and an endpoint behavior field (Endpoint Behavior) corresponding to each index field. If the index quantity field is Num, at least one index field includes index 0, index 1, . . . , index Num-1, and correspondingly, the endpoint behavior field includes endpoint behavior 0, endpoint behavior 1, . . . , endpoint behavior Num-1.

In IS-IS protocol, the type field, length field, flags field, block identity field, index quantity field, index length field and each endpoint behavior field in SRv6 End Index Sub-TLV may each occupy 8 bits, and the number of bits occupied by each index field is variable. In other protocols, the length of each field and the arrangement order of each field are not limited to this, and the example of the present disclosure does not limit this.

In an example, the sub-TLV in the fourth message may also be SRv6 End SID Index Sub-TLV, in this case, the value of the block identity field of SRv6 End SID Index Sub-TLV is the third Block Identity in the fourth message, and the value of the index field may be the second index value in the fourth message.

In an example, the second sub-TLV further includes an offset field, the third sub-TLV further includes an offset field, and the fourth sub-TLV further includes an offset field, which may carry the first offset.

The offset included in the second sub-TLV is an offset of the address space corresponding to the block Identity included in the second sub-TLV.

The offset included in the third sub-TLV is an offset of the address space corresponding to the block Identity included in the third sub-TLV.

The offset included in the third sub-TLV is an offset of the address space corresponding to the block Identity included in the third sub-TLV.

The above-mentioned FIGS. 10-a to 10-d show the TLV in the link state message sent based on IS-IS protocol. The TLV in the link state message sent based on OSPFv3 is basically similar to the TLV in the link state message sent based on IS-IS protocol. Here, the structure of the TLV in the link state message sent based on OSPFv3 will not be specifically described.

For the sake of understanding, taking two adjacent devices, namely device 1 and device 2, as examples, the issuing process of SIDs stored in device 1 will be described. Now, assume that there are two device SIDs stored in device 1, which are respectively represented as: 1::101:0 and 1::102:0. The number of Blocks allocated by device 1 is 1, and the Block Identity of this Block is 1, and the address space is from 1::100:0 to 1::200:0.

The index information corresponding to the SID of the above allocated Block of device 1 is expressed as: Index 1:1::101:0, and Index 2:1::102:0. The index corresponding to SID 1::101:0 is Index 1, and the index corresponding to SID 1::102:0 is Index 2.

At a certain moment, device 1 sends a link state message 1 carrying SRv6 SID Block sub-TLV and a link state message 2 carrying SRv6 End SID Index Sub-TLV to its neighboring device, namely device 2. In SRv6 SID Block sub-TLV, the block Identity (Block-ID) field is 1, the start SID field is 1::100:0, the End SID field is 1::200:0, and the offset field is 16. In SRv6 End SID Index Sub-TLV, the Segment Identity field is 1, the index number (i.e., Index Num) field is 2, the Index Length field is 1, the Index 0 field is 1 byte with a value of 1 (i.e., the index value is 1), and the Index 1 field is 1 byte with a value of 2 (i.e., the index value is 2).

After receiving the link state message 1 and the link state message 2 sent by the device 1, with respect for the Index 0 in SRv6 End SID Index Sub-TLV, the device 2 may offset its index value (i.e. 1) according to the offset (i.e. 16) in the offset field, that is, offset the index value 1 by 16 bits to the left to obtain the offset address 0::1:0. At this time, the device 2 may add the offset address 0::1:0 to the starting SID (that is, 1::100:0) to obtain SID 1::101:0.

For Index 1 in SRv6 End SID Index Sub-TLV, the index value (i.e., 2) may be offset according to the offset (i.e., 16) in the offset field, that is, the index value 2 is offset to the left by 16 bits to obtain the offset address 0::2:0, at this time, device 2 may add the offset address 0::2:0 to the start SID (that is, 1::100:0) to obtain SID 1::102:0.

At this time, device 2 may determine that the SIDs issued by device 1 are 1::101:0 and 1::102:0.

When a device has many neighbors or uses a large number of Flex-Algorithms, a large number of link SIDs (End. X SIDs) need to be issued, which further increases the message overhead when issuing SIDs. In order to reduce the message overhead in the process of issuing SIDs, an example of the present disclosure may further compress the message content in the process of issuing SIDs.

Figure 11:
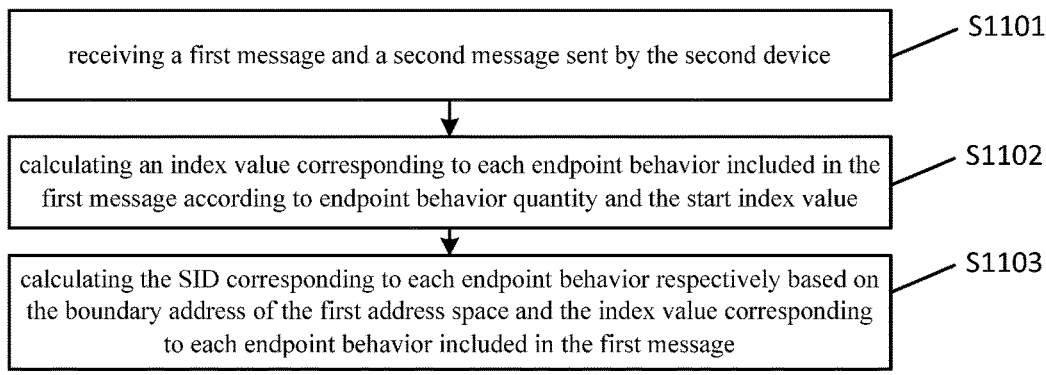
FIG. 11 is a seventh schematic flowchart of a method for determining a Segment Identity provided by an example of the present disclosure.

Based on this, in another example of the present disclosure, the first message in the above block S201 further includes endpoint behavior quantity and endpoint behaviors, and the first index value in the above block S201 may be the start index value, which is the index value corresponding to the first endpoint behavior included in the first message. On this basis, the example of the present disclosure provides another method for determining a Segment Identity, as shown in FIG. 11, which specifically includes the following blocks:

S1101, receiving a first message and a second message sent by the second device.

The first message includes at least one first Block Identity, the boundary address of the address space corresponding to each first Block Identity, endpoint behavior quantity and endpoint behaviors; the second message includes at least one second Block Identity and a first index value. Each endpoint behavior included in the first message corresponds to one index value, and the index values corresponding to multiple endpoint behaviors included in the first message are continuous. The first index value included in the second message is a start index value, the start index value is an index value corresponding to the first endpoint behavior included in the first message.

For example, if endpoint behavior quantity included in the first message is 4, the first message includes 4 endpoint behaviors, and if the index value corresponding to the first endpoint behavior is 1, the first index value included in the second message is 1.

In the example of the present disclosure, a plurality of link SIDS are stored in the second device, and Block identities included in the first message and the second message are identities of the Blocks to which the link SIDs belong.

In the case that the first message further includes endpoint behavior quantity and endpoint behaviors, block S202 may be specifically implemented as:

S1102, calculating an index value corresponding to each endpoint behavior included in the first message according to endpoint behavior quantity and the start index value.

It can be understood that an index value corresponding to the first endpoint behavior included in the first message is a start index value, an index value corresponding to the second endpoint behavior is the start index value plus 1, an index value corresponding to the third endpoint behavior is the start value plus 1 and then plus 1, and so on, the index value corresponding to each endpoint behavior included in the first message may be calculated.

In an example, block S1102 may be specifically implemented as: taking the sum of the start index value and N as an index value corresponding to the Nth endpoint behavior included in the first message, wherein the value range of N is from 0 to the difference between endpoint behavior quantity and 1.

For example, if the number of the endpoint behavior included in the first message is 4, the index value corresponding to the 0th endpoint behavior included in the first message is the start index value, the index value corresponding to the 1st endpoint behavior is the sum of the start index value and 1, the index value corresponding to the 2nd endpoint behavior is the sum of the start index value and 2, the index value corresponding to the 3rd endpoint behavior is the sum of the start index value and 3, and the index value corresponding to the 4th endpoint behavior is the sum of the start index value and 4.

S1103, calculating an SID corresponding to each endpoint behavior respectively based on the boundary address of the first address space and the index value corresponding to each endpoint behavior included in the first message.

Adopting the example of the present disclosure, compared with the SID issuing process in the related technology, which needs to carry the complete SID, the first message and the second message do not carry the complete SID in the example of the present disclosure. In addition, under the condition that multiple link SIDS need to be issued, the second message does not need to carry the index value corresponding to each link SID, by carrying the start index value, the first device may calculate an index value corresponding to each endpoint behavior by using the start index value included in the second message and endpoint behavior quantity included in the first message, and then calculate the SID corresponding to each endpoint behavior. Therefore, when the second device includes many neighboring devices or uses a large number of Flex-Algorithms, the method provided by the example of the present disclosure may reduce the data amount that the second message needs to carry, and reduce the message overhead in the process of issuing the link SID, thus ensuring the performance of devices and the stability of the message transmission protocol.

In an example, in the case that neither the first message nor the second message includes the first offset, S1033 may be specifically implemented as follows: taking the index value corresponding to each endpoint behavior as the first offset address, and calculating the SID corresponding to each endpoint behavior respectively based on the boundary address of the first address space and the first offset address corresponding to each endpoint behavior.

In another possible implementation, the first message further includes a first offset, or the second message further includes a first offset. In case that the first message or the second message includes the first offset, S1033 may specifically include the following blocks:

block A, obtaining a first offset address corresponding to each endpoint behavior by offsetting the index value corresponding to each endpoint behavior by the first offset respectively according to the address rule of SID.

block B, calculating the SID corresponding to each endpoint behavior respectively, based on the boundary address of the first address space and the first offset address corresponding to each endpoint behavior.

In the case that the boundary address of the first address space is the start address of the first address space, block B specifically includes: calculating the sum of the start address and the first offset address corresponding to each endpoint behavior respectively; if each calculated sum is within the first address space, then each calculated sum is taken as an SID corresponding to each endpoint behavior.

Or, in the case that the boundary address of the first address space is the end address of the first address space, block B specifically includes: calculating the difference between the end address and the first offset address corresponding to each endpoint behavior respectively; if each calculated difference is within the first address space, then each calculated difference is determined as an SID corresponding to each endpoint behavior.

In block B, the method of calculating the SID corresponding to each endpoint behavior based on the boundary address of the first address space and each first offset address is the same as the method of calculating the first SID based on the boundary address and the first offset address of the first address space in the above-mentioned example, which may refer to the related description in the above-mentioned example and will not be repeated here.

In an example corresponding to FIG. 11, the first message may include a fifth sub-TLV, and the fifth sub-TLV includes a block identity field, a Start SID field, an End SID field, flags field, an algorithm field, a weight field, a behavior quantity field and an endpoint behavior field.

Wherein, the block identity field is to carry the first Block Identity; the Start SID field is to carry the start address of the first address space; the End SID field is to carry the end address of the first address space.

The flags field is to carry shared flags, which are shared by a plurality of SIDs included in a Block characterized by the first Block Identity; the algorithm field is to carry the shared algorithm, and the shared algorithm is shared by a plurality of SIDs included in the Block characterized by the first Block Identity; the weight field is to carry the shared weight, and the shared weight is shared by a plurality of SIDs included in the Block characterized by the first Block Identity.

The behavior quantity field is to carry the quantity of endpoint behaviors; each endpoint behavior is to carry one endpoint behavior.

In an example, the above first message may be a link-state message, and the fifth sub-TLV may be a Rule-based End.X SID Block sub-TLV included in the link-state message, according to the current protocol, the link-state message includes SRv6 Locator TLV, and the fifth sub-TLV in the present disclosure example is a sub-TLV of SRv6 Locator TLV, but this is not limited in the present disclosure example, and the fifth sub-TLV may also be other TLV included in the first message.

As shown in FIG. 12-a, FIG. 12-a is a schematic diagram of the Rule-based End.X SID Block sub-TLV provided by an example of the present disclosure, according to the current protocol, the Rule-based End.X SID Block sub-TLV includes a type field, a length field, a Sub sub-TLV length field (Sub-sub-tlv-len) and a Sub sub-TLV field (Sub-sub-TLVs). In the example of the present disclosure, in addition to the above fields, the Rule-based End.X SID Block sub-TLV further includes a block identity field, a Start SID field, an End SID field, flags field, an algorithm field, a weight field, a behavior quantity field and an endpoint behavior field.

In an example, the Rule-based End.X SID Block sub-TLV may further include an offset field, which may carry a first offset, and the first offset is to represent the offset of the boundary address of the address space corresponding to the block Identity included in the Rule-based End.X SID Block sub-TLV. In FIG. 12-a, taking one block Identity as an example, it may be understood that when the Rule-based End.X SID Block sub-TLV includes multiple block identities, the first offset may be to represent the offset of the boundary address of the address space corresponding to each block Identity.

The number of bits occupied by the fields originally included in the Rule-based End.X SID Block sub-TLV is the number of bits specified by IS-IS protocol, and the number of bits occupied by newly added fields may be set based on actual requirements, which is not limited by the examples of the present disclosure. FIG. 12-a is only an example, and the length of each field and the arrangement order of each field are not limited to this.

In the example corresponding to FIG. 11, the second message may include the sixth sub-TLV or the seventh sub-TLV.

The sixth sub-TLV is to carry the index of the link SID of P2P adjacency type; the sixth sub-TLV includes a block identity field, an index length field and a start index field.

The seventh sub-TLV is to carry the index of a link SID of a local area network LAN adjacency type; the seventh sub TLV includes a block identity field, an index length field and a start index field.

Wherein, the block identity field is to carry the second Block Identity; the index length field is to carry the length of the start index field; the start index field is to carry the above start index value.

In an example, the above second message may be a link state message, the sixth sub-TLV may be a Rule-based End.X SID Index sub-TLV included in the link state message, and the seventh sub-TLV may be a Rule-based LAN End.X SID Index sub-TLV included in the link state message. According to the current protocol, the sixth sub-TLV and the seventh sub-TLV in the example of the present disclosure may be taken as the sub-TLVs of the above TLV-22, TLV-23, TLV-25, TLV-141, TLV-222 or TLV-223. However, the example of the present disclosure is not limited to this, and the sixth sub-TLV and the seventh sub-TLV may also be taken as sub-TLVs of other TLVs included in the second message.

FIG. 12-b is a schematic diagram of Rule-based End.X SID Index sub-TLV provided by an example of the present disclosure; FIG. 12-c is a schematic diagram of Rule-based LAN End.X SID Index sub-TLV provided by an example of the present disclosure.

According to the current protocol, both Rule-based End.X SID Index sub-TLV and Rule-based LAN End.X SID Index sub-TLV include a type field and a length field. In the example of the present disclosure, the flags field, algorithm field and weight field originally included in the Rule-based End.X SID Index sub-TLV and Rule-based LAN End.X SID Index sub-TLV are carried in the fifth sub-TLV, the sixth sub-TLV and the seventh sub-TLV, which carry the same Block Identity as the fifth sub-TLV, may share the flags field, algorithm field and weight field carried by the fifth sub-TLV, thus further reducing the message overhead in the process of issuing the link SID.

In the example of the present disclosure, the Rule-based End.X SID Index sub-TLV and the Rule-based LAN End.X SID Index sub-TLV may further include a block identity field, an index length field and a start index field. That is, the Rule-based End.X SID Index sub-TLV and the Rule-based LAN end. x SID index sub-TLV do not need to carry the indexes of all link SIDS that need to be announced, but only the index of the first link SID among a plurality of link SIDs with successive indexes, so that the message overhead in the process of issuing link SIDs may be further reduced.

In an example, the sixth sub-TLV (Rule-based End.X SID Index sub-TLV) may further include an offset field, and the seventh sub-TLV (Rule-based LAN End.X SID Index sub-TLV) may further include an offset field, which is to carry the first offset.

The first offset included in the Rule-based End.X SID Index sub-TLV is to represent the offset of the boundary address of the address space corresponding to the block Identity included in the Rule-based End.X SID Index sub-TLV. The first offset included in the Rule-based LAN End.X SID Index sub-TLV is to represent the offset of the boundary address of the address space corresponding to the block Identity included in the Rule-based LAN End.X SID Index sub-TLV.

The number of bits occupied by the fields originally included in the Rule-based End.X SID Index sub-TLV and Rule-based LAN End. X SID Index Sub-TLV is the number of bits specified in IS-IS protocol, and the number of bits occupied by newly added fields may be set based on actual requirements, which is not limited by the example of the present disclosure. FIG. 12-b and FIG. 12-c are examples only, and the length of each field and the arrangement order of each field are not limited to this.

In an example, based on the above example, in the example shown in FIG. 9, the first device may store a plurality of SIDs with successive indexes, and a first SID of the plurality of SIDs with successive indexes is the second SID. That is, a second index value included in the fourth message is the index value of the first SID in a plurality of SIDs with successive indexes. The above third message further includes endpoint behavior quantity and endpoint behaviors, where endpoint behavior quantity is the number of SIDs with successive indexes, and there is one-to-one correspondence between the plurality of SIDs with successive indexes and endpoint behaviors included in the third message.

Among them, the sub-TLV included in the third message may have the same structure as the TLV shown in FIG. 12-a, and the sub-TLV included in the third message may have the same structure as the TLV shown in FIG. 12-b or FIG. 12-c.

Based on the same inventive concept, according to the method for determining the Segment Identity provided by the above-mentioned example of the present disclosure, an example of the present disclosure also provides an apparatus for determining the Segment Identity. As shown in FIG.

13-*a*, FIG. 13-*a* is a schematic diagram of the first structure of the Segment Identity device provided by an example of the present disclosure. The apparatus is applied to the first device, and specifically includes the following modules.

A receiving module 1301 is to receive a first message and a second message sent by the second device; the first message includes at least one first Block Identity and the boundary address of the address space corresponding to each first Block Identity; the second message includes at least one second Block Identity and a first index value;

A calculating module 1302 is to calculate the first SID by using the boundary address of the first address space corresponding to a same Block and the first index value, where the same Block is a Block characterized by the same Block Identity in at least one first Block Identity and at least one second Block Identity.

In an example, the first message further includes a first offset, or the second message further includes a first offset; the calculation module 1302 is specifically to calculate the first SID according to the boundary address of the first address space, the first offset and the first index value.

In an example, the boundary address of the above first address space is the start address of the first address space;

The above-mentioned calculation module 1302 may specifically be to obtain the first offset address by offsetting the first index value by the first offset according to the address rule of SID, and to determine the first SID according to the start address and the first offset address.

In an example, the above-mentioned calculation module 1302 may be specifically to calculate the sum of the start address and the first offset address, if an SID corresponding to the sum is within the first address space, the SID corresponding to the sum is taken as the first SID.

In an example, the boundary address of the first address space is an end address of the first address space.

The above-mentioned calculation module 1302 may specifically be to obtain a second offset address by offsetting the first index value by the first offset according to the address rule of SID, and to determine the first SID according to the end address and the second offset address.

In an example, the above-mentioned calculation module 1302 may be specifically to calculate the difference between the end address and the second offset address; if the SID corresponding to the difference is within the first address space, the SID corresponding to the difference is determined as the first SID.

In an example, the first message includes a first sub-TLV, and the first sub-TLV includes a block identity field, a start SID field and an End SID field;

The Block identity field is to carry at least one first Block Identity; the Start SID field is to carry the start address of the address space corresponding to each first Block; the End SID field is to carry the end address of the address space corresponding to each first Block.

In an example, the first sub-TLV further includes an offset field, which is to carry the first offset.

In an example, the second message includes a second sub-TLV, a third sub-TLV or a fourth sub-TLV;

the second sub-TLV is to carry an index of a link SID of a peer-to-peer P2P adjacency type; the second sub TLV includes a block identity field, an index quantity field, an index length field, at least one index field and an endpoint behavior field corresponding to each index field;

the third sub-TLV is to carry an index of a link SID of a local area network LAN adjacency type; the third sub-TLV includes a block identity field, an index quan-tity field, an index length field, at least one index field and an endpoint behavior field corresponding to each index field;

the fourth sub-TLV is to carry an index of the device SID; the fourth sub-TLV includes a block identity field, an index quantity field, an index length field, at least one index field and an endpoint behavior field corresponding to each index field;

wherein, the Block identity field is to carry the second Block Identity; the index quantity field is to carry the index quantity; the index length field is to carry the index length; each index field is to carry one index value; each endpoint behavior field is to carry an endpoint behavior corresponding to one index value.

In an example, the second sub-TLV further includes an offset field, the third sub-TLV further includes an offset field, and the fourth sub-TLV further includes an offset field, the offset field is to carry the first offset.

In an example, the first message further includes endpoint behavior quantity and endpoint behaviors; the first index value is a start index value, the start index value is an index value corresponding to the first endpoint behavior included in the first message;

A calculation module 1302 is specifically to calculate the index value corresponding to each endpoint behavior included in the first message according to endpoint behavior quantity and the start index value; calculate the SID corresponding to each endpoint behavior respectively, based on the boundary address of the first address space and the index value corresponding to each endpoint behavior included in the first message.

In an example, the calculation module 1302 may be specifically to take the sum of the start index value and N as an index value corresponding to the Nth endpoint behavior included in the first message, where the value range of N is from 0 to the difference between endpoint behavior quantity and 1.

In an example, the first message further includes a first offset, or the second message further includes a first offset;

A calculation module 1302 is specifically to obtain a first offset address corresponding to each endpoint behavior by offsetting an index value corresponding to each endpoint behavior by a first offset respectively according to the address rule of SID, and to calculate an SID corresponding to each endpoint behavior respectively, based on the boundary address of the first address space and the first offset address corresponding to each endpoint behavior.

In an example, the boundary address of the first address space is the start address of the first address space;

A calculation module 1302 may be specifically to respectively calculate the sum of the start address and the first offset address corresponding to each endpoint behavior; if each calculated sum is within the first address space, then each calculated sum is taken as the SID corresponding to each endpoint behavior.

In an example, the boundary address of the first address space is the end address of the first address space;

The calculation module 1302 is specifically to calculate the difference between the end address and the first offset address corresponding to each endpoint behavior, if each of the calculated difference is within the first address space, then each of the calculated difference is taken as an SID corresponding to each endpoint behavior.

In an example, the first message includes a fifth sub-TLV, and the fifth sub-TLV includes a block identity field, a Start SID field, an End SID field, a flags field, an algorithm field, a weight field, a behavior quantity field and an endpoint behavior field.

Wherein, the Block identity field is to carry the first Block Identity; the Start SID field is to carry the start address of the first address space; the End SID field is to carry the end address of the first address space; the flags field is to carry shared flags, which are shared by a plurality of SIDs included in a Block characterized by the first Block Identity.

The algorithm field is to carry the shared algorithm, and the shared algorithm is shared by a plurality of SIDs included in a Block characterized by the first Block Identity; the weight field is to carry a shared weight, and the shared weight is shared by a plurality of SIDs included in a Block characterized by the first Block Identity; the behavior quantity field is to carry the quantity of endpoint behaviors; each endpoint behavior is to carry one endpoint behavior.

In an example, the fifth sub-TLV further includes an offset field, the offset field is to carry the first offset.

In an example, the second message includes a sixth sub-TLV or a seventh sub-TLV;

The sixth sub-TLV is to carry the index of a link SID of a peer-to-peer P2P adjacency type; the sixth sub TLV includes a block identity field, an index length field and a start index field;

The seventh sub-TLV is to carry the index of a link SID of a local area network LAN adjacency type; the seventh sub TLV includes a block identity field, an index length field and a start index field;

wherein, the Block identity field is to carry a second Block Identity; the index length field is to carry length of a start index field; the start index field is to carry the start index value.

In an example, the sixth sub-TLV further includes an offset field, and the seventh sub-TLV further includes an offset field, the offset field is to carry the first offset.

In an example, the first device stores a second SID; as shown in FIG. 13-*b*, the apparatus for determining the Segment Identity may further comprise:
  an obtaining module 1303 is to obtain the stored second SID;
  a first determining module 1304 is to determine a target Block to which the second SID belongs according to the corresponding relationship between respective pre-divided blocks and the address space;
  a second determining module 1305 is to determine a second index value corresponding to the second SID according to the corresponding relationship between respective SIDs and index values in a second address space corresponding to the target Block;
  a sending module 1306 is to send a third message and a fourth message to each neighbor device, wherein the third message includes a third Block Identity of the target Block, a second offset and a boundary address of a second address space, and the fourth message includes the third Block Identity and the second index value.

In an example, the first device stores a plurality of SIDs with successive indexes, and a first SID of the plurality of SIDs with successive indexes is the second SID;

The third message further includes endpoint behavior quantity and endpoint behaviors, where endpoint behavior quantity is the number of SIDs with successive indexes; there is a one-to-one correspondence between multiple SIDs with successive indexes and endpoint behaviors included in the third message.

In an example, the calculation module 1302 is to calculate the second offset of the boundary address of the second address space according to the attribute characteristics of each address in the second address space.

Based on the same inventive concept, according to the method for determining the Segment Identity provided by the above-mentioned example of the present disclosure, the example of the present disclosure also provides an electronic device, which includes a processor 1401, a machine-readable storage medium 1402 and a transceiver 1404, as shown in FIG. 14. The machine-readable storage medium 1402 stores machine executable instructions that may be executed by the processor 1401; the machine executable instructions prompt the processor 1401 to perform the following operations:
  receiving a first message and a second message sent by the second device through the transceiver 1404; the first message includes at least one first Block Identity and the boundary address of the address space corresponding to each first Block Identity; the second message includes at least a second Block Identity and a first index value;
  calculating the first SID by using a boundary address of a first address space corresponding to a same block and the first index value, where the same Block is a Block characterized by a same Block Identity in at least one first Block Identity and at least one second Block Identity.

In an example, the first message further includes a first offset, or the second message further includes a first offset; the machine executable instructions cause the processor 1401 to perform the following operation: calculating the first SID according to the boundary address of the first address space, the first offset and the first index value.

In an example, the boundary address of the first address space is the start address of the first address space;
  the machine executable instructions also cause the processor 1401 to perform the following operation: obtaining a first offset address by offsetting the first index value by a first offset according to the address rules of SID, and calculating the first SID according to the start address and the first offset address.

In an example, the machine executable instructions also cause the processor 1401 to perform the following blocks: calculating the sum of the start address and the first offset address; if a SID corresponding to the sum is within the first address space, taking the SID corresponding to the sum as the first SID.

In an example, the boundary address of the first address space is the end address of the first address space;
  The machine executable instructions also cause the processor 1401 to perform the following operation: obtaining a second offset address by offsetting the first index value by the first offset according to the address rules of SID, and calculating the first SID according to the end address and the second offset address.

In an example, the machine executable instructions also cause the processor 1401 to perform the following operation:
  calculating the difference between the end address and the second offset address; if the SID corresponding to the difference is within the first address space, taking the SID corresponding to the difference as the first SID.

In an example, the first message includes a first sub-TLV, and the first sub-TLV includes a block identity field, a Start SID field and an End SID field, wherein, the Block identity field is to carry at least one first Block Identity; the Start SID field is to carry the start address of the address space corresponding to each first Block; the End SID field is to carry the end address of the address space corresponding to each first Block.

In an example, the first sub-TLV further includes an offset field, the offset field is to carry the first offset.

In an example, the second message includes a second sub-TLV, the third sub-TLV or the fourth sub-TLV;
  the second sub-TLV is to carry an index of a link SID of a peer-to-peer P2P adjacency type; the second sub TLV includes a block identity field, an index quantity field, an index length field, at least one index field and an endpoint behavior field corresponding to each index field;
  the third sub-TLV is to carry the index of a link SID of a local area network LAN adjacency type; the third sub-TLV includes a block identity field, an index quantity field, an index length field, at least one index field and an endpoint behavior field corresponding to each index field;
  the fourth sub-TLV is to carry the index of the device SID; the fourth sub-TLV includes a block identity field, an index quantity field, an index length field, at least one index field and an endpoint behavior field corresponding to each index field;
  wherein, the Block identity field is to carry the second Block Identity; the index quantity field is to carry the index quantity; the index length field is to carry the index length; each index field is to carry one index value; each endpoint behavior field is to carry an endpoint behavior corresponding to one index value.

In an example, the second sub-TLV further includes an offset field, the third sub-TLV further includes an offset field, and the fourth sub-TLV further includes an offset field, the offset field is to carry the first offset.

In an example, the first message further includes endpoint behavior quantity and endpoint behaviors; the first index value is the start index value, the start index value is the index value corresponding to the first endpoint behavior included in the first message;
  the machine executable instructions cause the processor 1401 to perform the following operations: calculating an index value corresponding to each endpoint behavior included in the first message according to endpoint behavior quantity and the start index value; calculating an SID corresponding to each endpoint behavior respectively based on the boundary address of the first address space and an index value corresponding to each endpoint behavior included in the first message.

In an example, the machine executable instructions cause the processor 1401 to perform the following blocks:
  taking the sum of the start index value and N as an index value corresponding to the Nth endpoint behavior included in the first message, where the value range of N is from 0 to the difference between endpoint behavior quantity and 1.

In an example, the first message further includes a first offset, or the second message further includes a first offset; the machine executable instructions cause the processor 1401 to perform the following operations: obtaining a first offset address corresponding to each endpoint behavior by offsetting an index value corresponding to each endpoint behavior by a first offset respectively according to the address rules of SID; calculating an SID corresponding to each endpoint behavior respectively based on the boundary address of the first address space and the first offset address corresponding to each endpoint behavior.

In an example, the boundary address of the first address space is the start address of the first address space; the machine executable instructions cause the processor 1401 to perform the following operations: calculating the sum of the start address and the first offset address corresponding to each endpoint behavior respectively; if each calculated sum is within the first address space, taking each calculated sum as the SID corresponding to each endpoint behavior.

In an example, the boundary address of the first address space is the end address of the first address space; the machine executable instructions cause the processor 1401 to perform the following operations: calculating the difference between the end address and the first offset address corresponding to each endpoint behavior respectively; if each calculated difference is within the first address space, taking each calculated difference as the SID corresponding to each endpoint behavior.

In an example, the first message includes a fifth sub-TLV, and the fifth sub-TLV includes a block identity field, a start SID field, an End SID field, a flags field, an algorithm field, a weight field, a behavior quantity field and an endpoint behavior field.

Wherein, the Block identity field is to carry the first Block Identity; the Start SID field is to carry the start address of the first address space; the End SID field is to carry the end address of the first address space; the flags field is to carry shared flags, the shared flags are shared by a plurality of SIDs included in the Block characterized by the first Block Identity; the algorithm field is to carry a shared algorithm, and the shared algorithm is shared by a plurality of SIDs included in a Block characterized by the first Block Identity; the weight field is to carry a shared weight, and the shared weight is shared by a plurality of SIDs included in the Block characterized by the first Block Identity; the behavior quantity field is to carry the quantity of endpoint behaviors; each endpoint behavior is to carry one endpoint behavior.

In an example, the fifth sub-TLV further includes an offset field, the offset field is to carry the first offset.

In an example, the second message includes the sixth sub-TLV or the seventh sub-TLV; the sixth sub-TLV is to carry an index of a link SID of a peer-to-peer P2P adjacency type; the sixth sub TLV includes a block identity field, an index length field and a start index field; the seventh sub-TLV is to carry the index of a link SID of a local area network LAN adjacency type; the seventh sub TLV includes a block identity field, an index length field and a start index field; wherein, the Block identity field is to carry the second Block Identity; the index length field is to carry the length of the start index field; the start index field is to carry the start index value.

In an example, the sixth sub-TLV further includes an offset field, and the seventh sub-TLV further includes an offset field, the offset field is to carry the first offset.

In an example, the first device stores the second SID; the machine executable instructions cause the processor 1401 to perform the following operations: obtaining the stored second SID; determining a target block to which the second SID belongs according to the corresponding relationship between respective pre-divided blocks and the address space; determining the second index value corresponding to the second SID according to the corresponding relationship between respective SIDs and index values in a second address space corresponding to the target Block; sending a third message and a fourth message to each neighbor device through the transceiver 1404, wherein the third message includes the third Block Identity of the target Block and the boundary address of the second address space, and the fourth message includes the third Block Identity and the second index value.

In an example, the first device stores a plurality of SIDs with successive indexes, and the first SID of the plurality of SIDs with successive indexes is the second SID;

The third message further includes endpoint behavior quantity and endpoint behaviors, where endpoint behavior quantity is the number of SIDs with successive indexes; there is a one-to-one correspondence between multiple SIDs with successive indexes and endpoint behaviors included in the third message.

In an example, the third message further includes a second offset, or the fourth message further includes a second offset; the machine executable instructions cause the processor 1401 to perform the following operation: calculating the second offset of the boundary address of the second address space according to the attribute characteristics of each address in the second address space.

As shown in FIG. 14, the electronic device may further include a communication bus 1403. The processor 1401, the machine-readable storage medium 1402 and the transceiver 1404 communicate with each other through a communication bus 1403, which may be a Peripheral Component Interconnect (PCI) bus or an Extended Industry Standard Architecture (EISA) bus. The communication bus 1403 may be divided into address bus, data bus, control bus, etc.

The transceiver 1404 may be a wireless communication module. Under the control of the processor 1401, the transceiver 1404 performs data interaction with other devices (AC and terminal).

The machine-readable storage medium 1402 may include Random Access Memory (RAM) or Non-Volatile Memory (NVM), such as at least one disk memory. In addition, the machine-readable storage medium 1402 may also be at least one storage device located away from the aforementioned processor.

The processor 1401 may be a general-purpose processor, including a Central Processing Unit (CPU), a Network Processor (NP), etc., it may also be a Digital Signal Processing (DSP), an Application Specific Integrated Circuit (ASIC), a Field-Programmable Gate Array (FPGA) or other programmable logic devices, discrete gate or transistor logic devices, and discrete hardware components.

Based on the same inventive concept, according to the method for determining a Segment Identity provided by the above-mentioned examples of the present disclosure, an example of the present disclosure also provides a machine-readable storage medium storing machine executable instructions that may be executed by the processor. The processor is caused by machine executable instructions to carry out any one of the above-mentioned method for determining a Segment Identity.

In yet another example provided by the present disclosure, there is also provided a computer program product containing instructions, which, when run on a computer, causes the computer to perform any one of the method for determining a Segment Identity in the above examples.

It should be noted that in this paper, relational terms such as first and second are only to distinguish one entity or operation from another entity or operation, and do not necessarily require or imply any such actual relationship or order between these entities or operations. Furthermore, the terms "comprising", "including" or any other variant thereof are intended to encompass non-exclusive inclusion, so that a process, method, article or device that includes a series of elements includes not only those elements, but also other elements not explicitly listed, or elements inherent to such process, method, article or equipment. Without further limitation, the element defined by the sentence "including a . . . " does not exclude that there are other identical elements in the process, method, article or equipment including the element.

Each example in this specification is described in a related way, and the same and similar parts between each example may be referred to each other, each example focuses on the differences from other examples, especially, for the apparatus for determining a Segment Identity, device and machine-readable storage medium. For the example of machine-readable storage medium, since it is basically similar to the example of the method for determining a Segment Identity, the description is relatively simple, and the relevant parts may be referred to the partial description of the example of the method for determining a Segment Identity.

The above are only preferred examples of the present invention and are not intended to limit the present invention, any modification, equivalent replacement, improvement, etc. made within the spirit and principle of the present invention shall be included within the protection range of the present invention.

What is claimed is:

1. A method for determining a Segment Identity, applied to a first device in an SRv6 network, wherein the SRv6 network further comprises a second device, wherein the first device and the second device are neighbor devices to each other, and the second device stores a first Segment Identity SID, and the method comprises:
   receiving a first message and a second message sent by the second device; wherein the first message comprises at least one first Block Identity and a boundary address of an address space corresponding to each first Block Identity; the second message comprises at least one second Block Identity and a first index value;
   calculating the first SID by using a boundary address of a first address space corresponding to a same Block and the first index value, wherein the same Block is a Block characterized by a same Block Identity in the at least one first Block Identity and the at least one second Block Identity.

2. The method according to claim 1, wherein the first message further comprises a first offset, or the second message further comprises a first offset;
   wherein calculating the first SID by using a boundary address of a first address space corresponding to a same Block and the first index value, specifically comprises:
   calculating the first SID according to the boundary address of the first address space, the first offset and the first index value.

3. The method according to claim 2, wherein the boundary address of the first address space is a start address of the first address space;
   wherein calculating the first SID according to the boundary address of the first address space, the first offset and the first index value, comprises:
   obtaining a first offset address by offsetting the first index value by the first offset according to an address rule of SID;
   calculating the first SID according to the start address and the first offset address.

4. The method according to claim 3, wherein calculating the first SID according to the start address and the first offset address, specifically comprises:
   calculating a sum of the start address and the first offset address;

if an SID corresponding to the sum is within the first address space, taking the SID corresponding to the sum as the first SID.

5. The method according to claim 2, wherein the boundary address of the first address space is an end address of the first address space;
calculating the first SID according to the boundary address of the first address space, the first offset and the first index value, specifically comprises:
obtaining a second offset address by offsetting the first index value by the first offset according to an address rule of SID;
calculating the first SID according to the end address and the second offset address.

6. The method according to claim 5, wherein calculating the first SID according to the end address and the second offset address, specifically comprises:
calculating a difference between the end address and the second offset address;
if an SID corresponding to the difference is within the first address space, taking the SID corresponding to the difference as the first SID.

7. The method according to claim 1, wherein, the first message comprises a first sub-TLV, the first sub-TLV comprises a block identity field, a Start SID field and an End SID field;
wherein the block identity field is to carry the at least one first Block Identity;
the Start SID field is to carry a start address of an address space corresponding to each first Block;
the End SID field is to carry an end address of the address space corresponding to each first Block.

8. The method according to claim 7, wherein the first sub-TLV further comprises an offset field, wherein the offset field is to carry a first offset.

9. The method according to claim 1, wherein the second message comprises a second sub-TLV, a third sub-TLV or a fourth sub-TLV;
the second sub-TLV is to carry an index of a link SID of a peer-to-peer P2P adjacency type; the second sub-TLV comprises a block identity field, an index quantity field, an index length field, at least one index field and an endpoint behavior field corresponding to each index field;
the third sub-TLV is to carry an index of a link SID of a local area network LAN adjacency type; the third sub-TLV comprises a block identity field, an index quantity field, an index length field, at least one index field and an endpoint behavior field corresponding to each index field;
the fourth sub-TLV is to carry an index of a device SID; the fourth sub-TLV comprises a block identity field, an index quantity field, an index length field, at least one index field and an endpoint behavior field corresponding to each index field;
wherein the block identity field is to carry the second Block Identity;
the index quantity field is to carry an index quantity;
the index length field is to carry an index length;
each index field is to carry one index value;
each endpoint behavior field is to carry an endpoint behavior corresponding to one index value.

10. The method according to claim 9, wherein the second sub-TLV further comprises an offset field, the third sub-TLV further comprises an offset field, and the fourth sub-TLV further comprises an offset field, the offset field is to carry a first offset.

11. The method of claim 1, wherein the first message further comprises an endpoint behavior quantity and endpoint behaviors;
the first index value is a start index value, and the start index value is an index value corresponding to a first endpoint behavior included in the first message;
wherein calculating the first SID by using a boundary address of a first address space corresponding to a same Block and the first index value, specifically comprises:
calculating an index value corresponding to each endpoint behavior included in the first message according to the endpoint behavior quantity and the start index value;
calculating an SID corresponding to each endpoint behavior respectively, based on the boundary address of the first address space and the index value corresponding to each endpoint behavior included in the first message.

12. The method according to claim 11, wherein calculating an index value corresponding to each endpoint behavior included in the first message according to the endpoint behavior quantity and the start index value, specifically comprises:
taking a sum of the start index value and N as an index value corresponding to an Nth endpoint behavior included in the first message, wherein N is in a range of 0 to the endpoint behavior quantity−1.

13. The method according to claim 11, wherein the first message further comprises a first offset, or the second message further comprises a first offset;
wherein calculating an SID corresponding to each endpoint behavior respectively based on the boundary address of the first address space and the index value corresponding to each endpoint behavior included in the first message, comprises:
obtaining a first offset address corresponding to each endpoint behavior respectively, by offsetting the index value corresponding to each endpoint behavior by the first offset according to an address rule of SID;
calculating the SID corresponding to each endpoint behavior respectively based on the boundary address of the first address space and the first offset address corresponding to each endpoint behavior.

14. The method of claim 13, wherein the boundary address of the first address space is a start address of the first address space;
wherein calculating the SID corresponding to each endpoint behavior respectively based on the boundary address of the first address space and the first offset address corresponding to each endpoint behavior, comprises:
calculating a sum value of the start address and the first offset address corresponding to each endpoint behavior respectively;
if each calculated sum is within the first address space, taking each calculated sum as the SID corresponding to each endpoint behavior.

15. The method of claim 13, wherein the boundary address of the first address space is an end address of the first address space;
wherein calculating the SID corresponding to each endpoint behavior respectively based on the boundary address of the first address space and the first offset address corresponding to each endpoint behavior, comprises:
calculating a difference between the end address and the first offset address corresponding to each endpoint behavior respectively;

if each calculated difference is within the first address space, taking each calculated difference as the SID corresponding to each endpoint behavior.

16. The method according to claim 11, wherein the first message includes a fifth sub-TLV, and the fifth sub-TLV comprises a block identity field, a Start SID field, an End SID field, a flags field, an algorithm field, a weight field, a behavior quantity field and an endpoint behavior field;
wherein the block identity field is to carry the first Block Identity;
the Start SID field is to carry a start address of the first address space;
the End SID field is to carry an end address of the first address space;
the flags field is to carry shared flags, and the shared flags are shared by a plurality of SIDs included in a Block characterized by the first Block Identity;
the algorithm field is to carry a shared algorithm, and the shared algorithm is shared by the plurality of SIDs included in the Block characterized by the first Block Identity;
the weight field is to carry a shared weight, and the shared weight is shared by the plurality of SIDs included in the Block characterized by the first Block Identity;
the behavior quantity field is to carry the endpoint behavior quantity;
each endpoint behavior is to carry one endpoint behavior.

17. The method according to claim 16, wherein the fifth sub-TLV further comprises an offset field, wherein the offset field is to carry a first offset.

18. The method according to claim 11, wherein the second message comprises a sixth sub-TLV or a seventh sub-TLV;
the sixth sub-TLV is to carry an index of a link SID of a peer-to-peer P2P adjacency type; the sixth sub-TLV comprises a block identity field, an index length field and a start index field;
the seventh sub-TLV is to carry an index of a link SID of a local area network LAN adjacency type; the seventh sub-TLV comprises a block identity field, an index length field and a start index field;
wherein the Block identity field is to carry the second Block Identity;
the index length field is to carry a length of the start index field;
the start index field is to carry the start index value.

19. The method of claim 18, wherein the sixth sub-TLV further comprises an offset field, and the seventh sub-TLV further comprises an offset field, wherein the offset field is to carry the first offset.

20. The method of claim 1, wherein the first device stores a second SID;
the method further comprises:
obtaining the stored second SID;
determining a target Block to which the second SID belongs according to a corresponding relationship between respective pre-divided blocks and address spaces;
determining a second index value corresponding to the second SID according to a corresponding relationship between respective SIDs and index values in a second address space corresponding to the target Block;
sending a third message and a fourth message to each neighbor device, wherein the third message comprises a third Block Identity of the target Block and a boundary address of the second address space, and the fourth message comprises the third Block Identity and the second index value.

21. The method according to claim 20, wherein, the first device stores a plurality of SIDs with successive indexes, wherein a first SID in the plurality of SIDs with successive indexes is the second SID;
the third message further comprises an endpoint behavior quantity and endpoint behaviors, wherein the endpoint behavior quantity is the number of SIDs with successive indexes; there is a one-to-one correspondence between SIDs with successive indexes and endpoint behaviors included in the third message.

22. The method according to claim 20, wherein the third message further comprises a second offset, or the fourth message further comprises a second offset;
before sending the third message and the fourth message to each neighbor device, the method further comprises:
calculating the second offset of the boundary address of the second address space according to attribute characteristics of each address in the second address space.

23. The method according to claim 12, wherein the first message further comprises a first offset, or the second message further comprises a first offset;
wherein calculating an SID corresponding to each endpoint behavior respectively based on the boundary address of the first address space and the index value corresponding to each endpoint behavior included in the first message, comprises:
obtaining a first offset address corresponding to each endpoint behavior respectively, by offsetting the index value corresponding to each endpoint behavior by the first offset according to an address rule of SID;
calculating the SID corresponding to each endpoint behavior respectively based on the boundary address of the first address space and the first offset address corresponding to each endpoint behavior.

24. The method according to claim 21, wherein the third message further comprises a second offset, or the fourth message further comprises a second offset;
before sending the third message and the fourth message to each neighbor device, the method further comprises:
calculating the second offset of the boundary address of the second address space according to attribute characteristics of each address in the second address space.

25. An electronic device, wherein the electronic device is a first device in an SRv6 network, and the SRv6 network further comprises a second device, wherein the first device and the second device are neighbor devices to each other, and the second device stores a first Segment Identity SID, and the electronic device comprises:
a processor;
a transceiver;
a machine-readable storage medium storing machine executable instructions that can be executed by the processor; the machine executable instructions cause the processor to perform the following:
receiving a first message and a second message sent by the second device through the transceiver; wherein the first message comprises at least one first Block Identity and a boundary address of an address space corresponding to each first Block Identity; the second message comprises at least one second Block Identity and a first index value;
calculating a first SID by using a boundary address of a first address space corresponding to a same Block and the first index value, wherein the same Block is a Block characterized by a same Block Identity in the at least one first Block Identity and the at least one second Block Identity.

\* \* \* \* \*